(12) United States Patent
Pivac et al.

(10) Patent No.: US 11,919,147 B2
(45) Date of Patent: Mar. 5, 2024

(54) GRIPPING APPARATUS

(71) Applicant: FASTBRICK IP PTY LTD, High Wycombe (AU)

(72) Inventors: Mark Joseph Pivac, Lesmurdie (AU); James Gary Robertson, Huntingdale (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 383 days.

(21) Appl. No.: 17/271,808

(22) PCT Filed: Aug. 29, 2019

(86) PCT No.: PCT/AU2019/000101
§ 371 (c)(1),
(2) Date: Feb. 26, 2021

(87) PCT Pub. No.: WO2020/041819
PCT Pub. Date: Mar. 5, 2020

(65) Prior Publication Data
US 2021/0323171 A1    Oct. 21, 2021

(30) Foreign Application Priority Data

Aug. 29, 2018  (AU) ................................ 2018903192

(51) Int. Cl.
*E04G 21/22*         (2006.01)
*B25J 9/16*          (2006.01)
(Continued)

(52) U.S. Cl.
CPC ........... *B25J 13/086* (2013.01); *B25J 9/1687* (2013.01); *B25J 13/085* (2013.01); *B25J 15/026* (2013.01); *E04G 21/22* (2013.01)

(58) Field of Classification Search
CPC ...... B25J 13/086; B25J 9/1687; B25J 13/085; B25J 15/026; B25J 13/088; B25J 19/023; B25J 13/08; B25J 15/0433; E04G 21/22
See application file for complete search history.

(56) References Cited

U.S. PATENT DOCUMENTS 5,197,847 A    3/1993  Kremer et al.
5,284,000 A    2/1994  Milne et al.
(Continued)

FOREIGN PATENT DOCUMENTS

CN    206844688 U    1/2018
CN    108582079 A    9/2018
(Continued)

OTHER PUBLICATIONS

International Search Report for International Application No. PCT/AU2019/000101 dated Nov. 5, 2019 (3 pages).
(Continued)

*Primary Examiner* — Adam R Mott
*Assistant Examiner* — Heather J Keniry
(74) *Attorney, Agent, or Firm* — Merchant & Gould P.C.

(57) ABSTRACT

The present disclosure relates to a gripping apparatus mounted to a robot arm for controllably placing an object on a surface. A gripper assembly supports a pair of gripping clamps which are configured to grip and release the object. The gripper assembly is mounted to the robot arm via a connector body. A sensor is configured to either measure a relative movement between the gripper assembly and the connector body, or to measure a force between the gripper assembly and the connector body. A controller is configured to stop the robot arm when the sensor indicates the measured relative movement or measured force exceeds a predefined threshold.

20 Claims, 15 Drawing Sheets

(51) Int. Cl.
  *B25J 13/08* (2006.01)
  *B25J 15/02* (2006.01)
  *B25J 15/04* (2006.01)
  *B25J 19/02* (2006.01)

(56) References Cited

U.S. PATENT DOCUMENTS

| | | |
|---|---|---|
| 9,937,622 B2 | 4/2018 | Naderer et al. |
| 10,150,220 B2* | 12/2018 | Iida ................ A61B 34/37 |
| 10,166,676 B1* | 1/2019 | Hudson ................ B25J 9/1612 |
| 10,220,513 B2 | 3/2019 | Shimodaira |
| 2017/0363464 A1* | 12/2017 | Shafer .................... G01D 5/30 |
| 2018/0029227 A1 | 2/2018 | Linnell et al. |
| 2018/0345503 A1* | 12/2018 | De Magistris ..... G01N 21/9515 |
| 2019/0176348 A1* | 6/2019 | Bingham ............... B25J 9/1697 |
| 2020/0024853 A1 | 1/2020 | Furrer et al. |

FOREIGN PATENT DOCUMENTS

| | | | |
|---|---|---|---|
| CN | 106671122 A | 1/2020 | |
| EP | 2460628 A2 | 6/2012 | |
| JP | 2018012183 A | 1/2018 | |
| WO | 2007/076581 A1 | 7/2007 | |
| WO | WO-2007076581 A1 * | 7/2007 | ............... B25J 5/00 |
| WO | WO-2016184966 A1 * | 11/2016 | ........... A01D 46/264 |
| WO | 2018/009985 A1 | 7/2017 | |
| WO | 2018/009980 A1 | 1/2018 | |
| WO | 2018/009981 A1 | 1/2018 | |
| WO | 2018009986 A1 | 1/2018 | |
| WO | 2018/063100 A2 | 4/2018 | |
| WO | 2019/006511 A1 | 1/2019 | |

OTHER PUBLICATIONS

Extended European Search Report for EP Application No. 19853789.6 dated May 18, 2022 (7 pages).

* cited by examiner

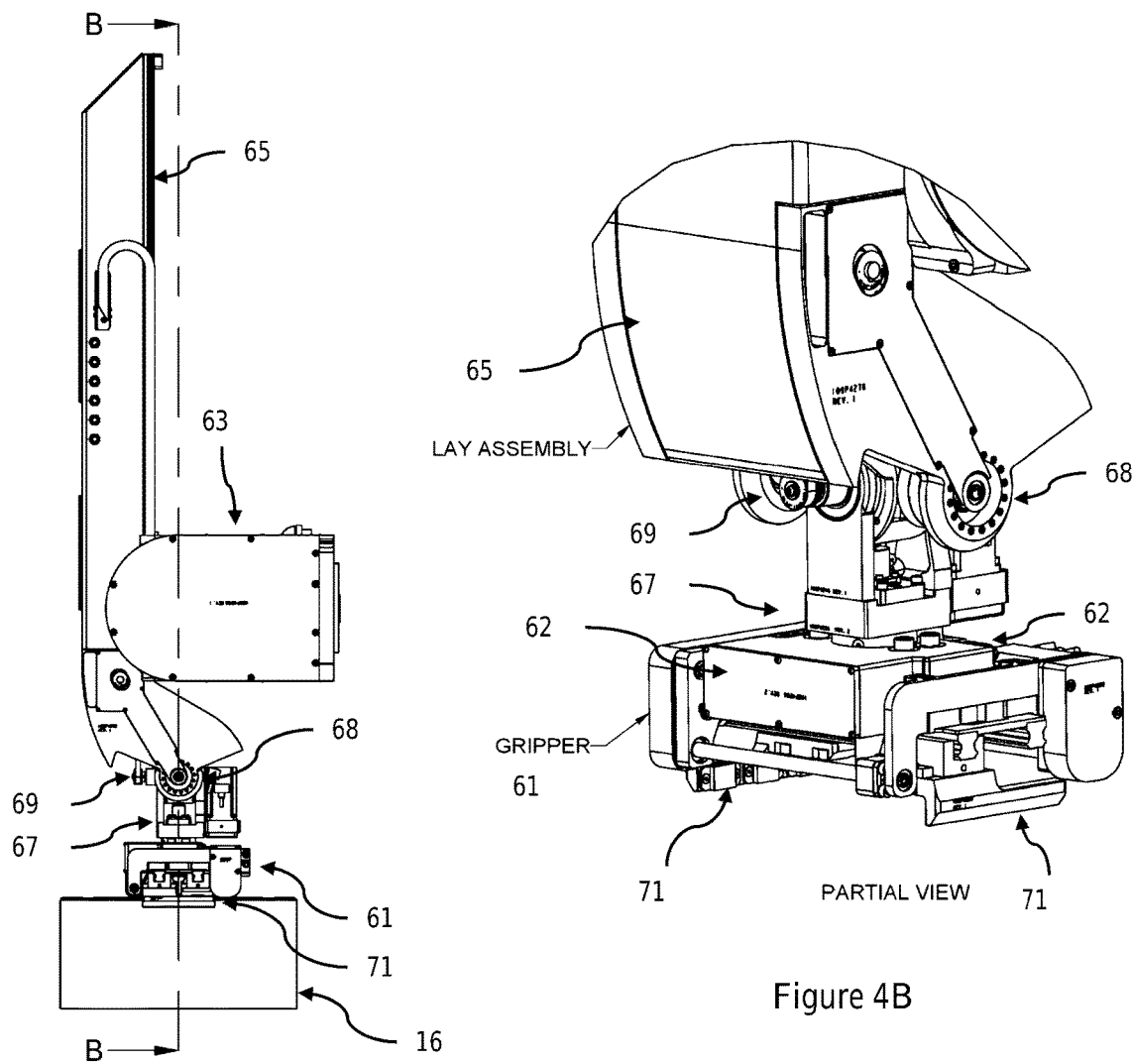
Figure 4A
Figure 4B
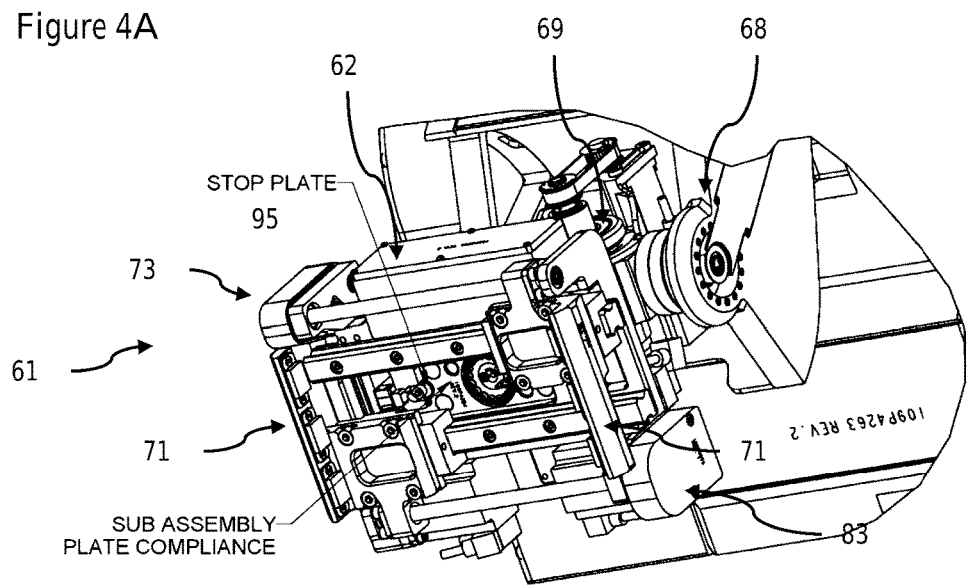
Figure 4C

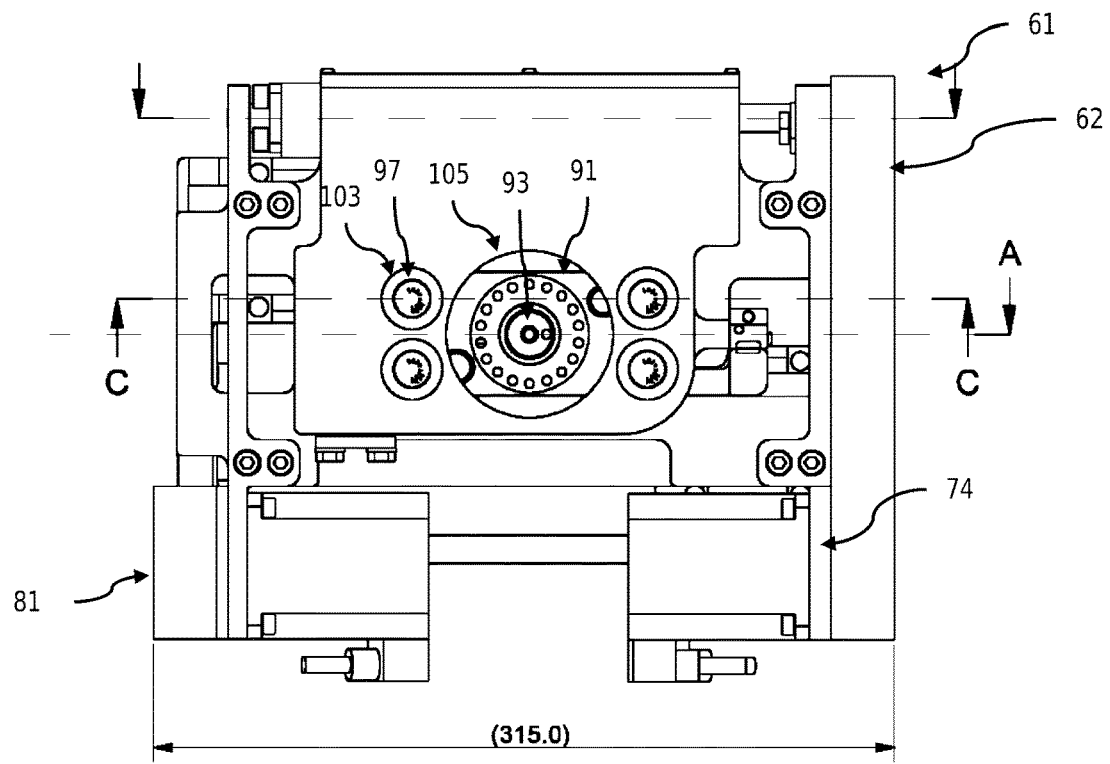
Figure 5F
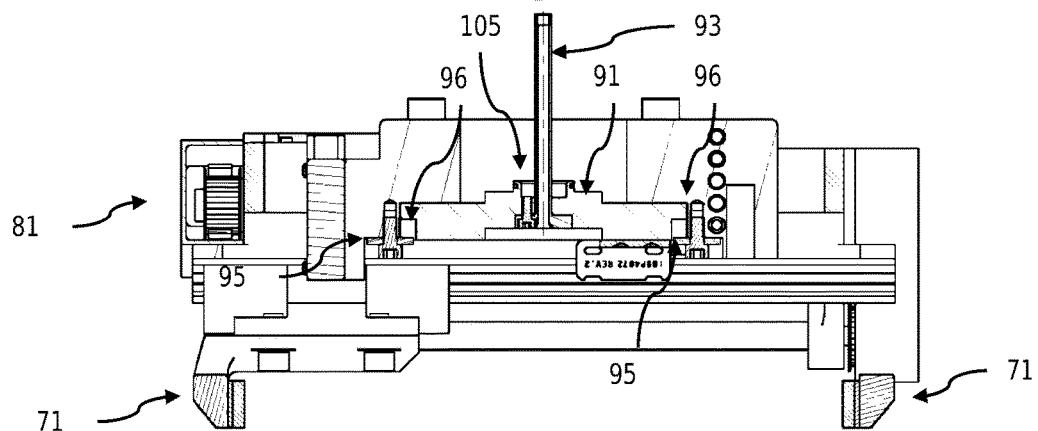
SECTION A-A          Figure 5G
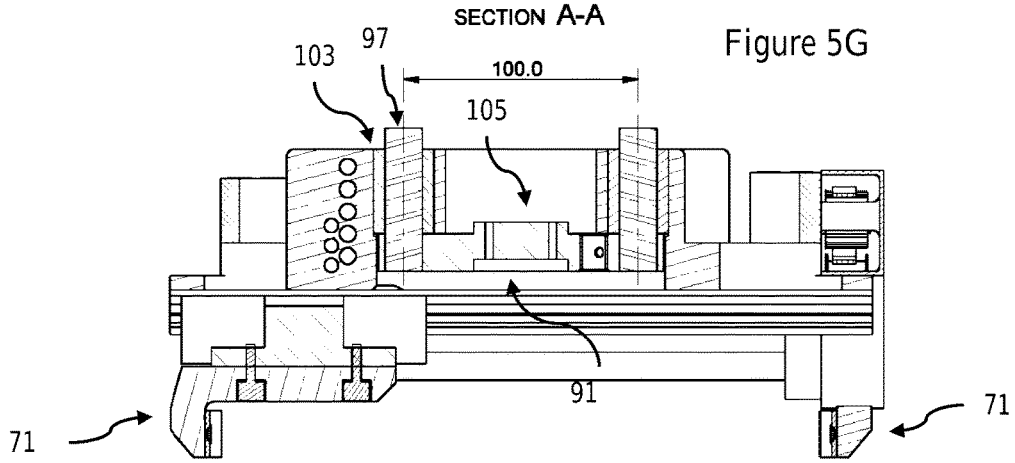
SECTION C-C          Figure 5H

SECTION B-B THROUGH GRIPPER

SECTION B-B THROUGH GRIPPER ENCODER LIMIT

DETAIL 1
SCALE 1:2

DETAIL 2
SCALE 1:2

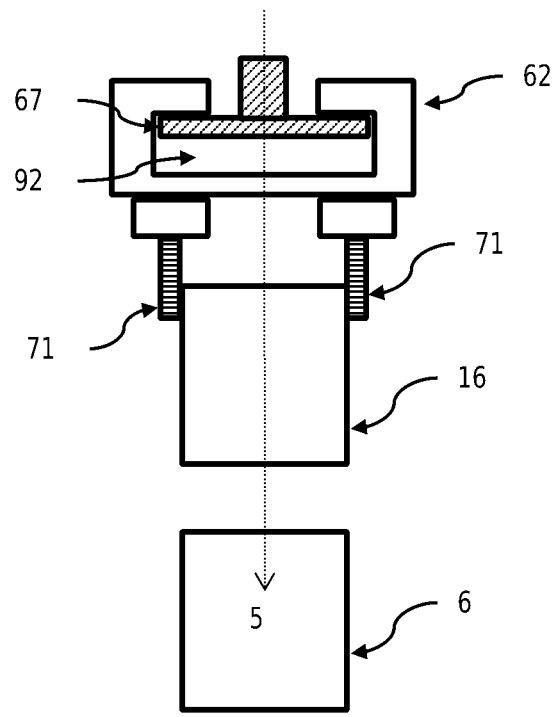
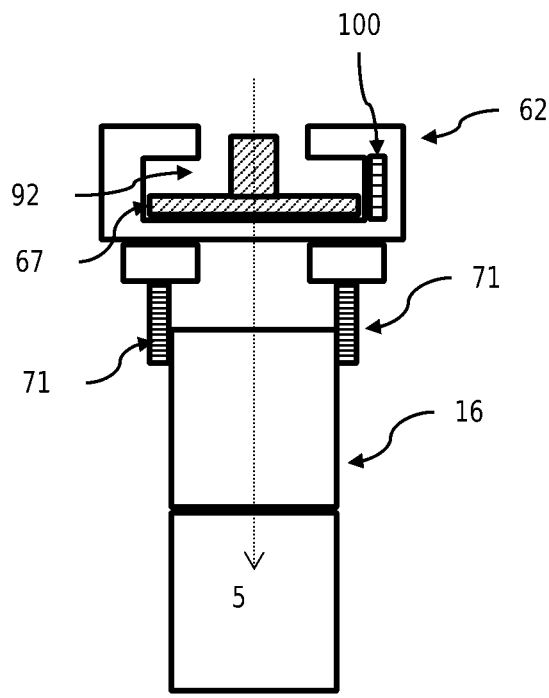
Figure 7A
Figure 7B
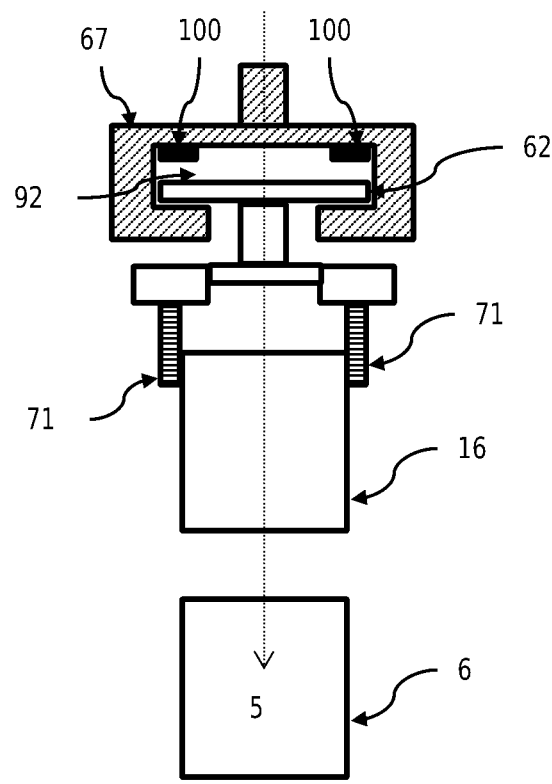
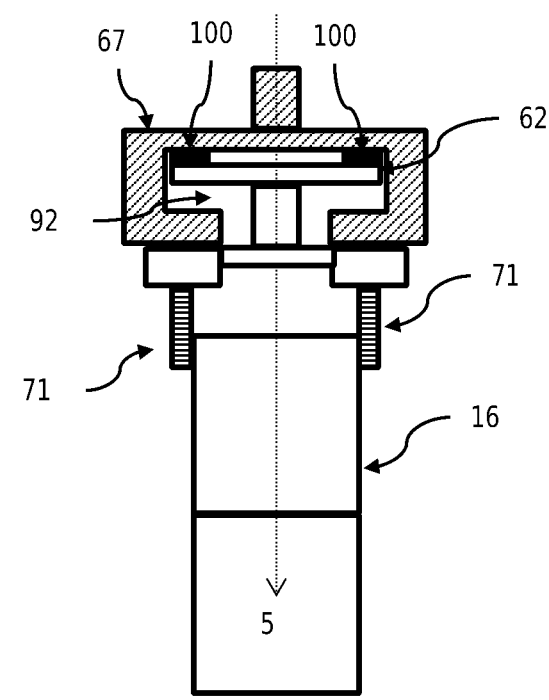
Figure 7C
Figure 7D

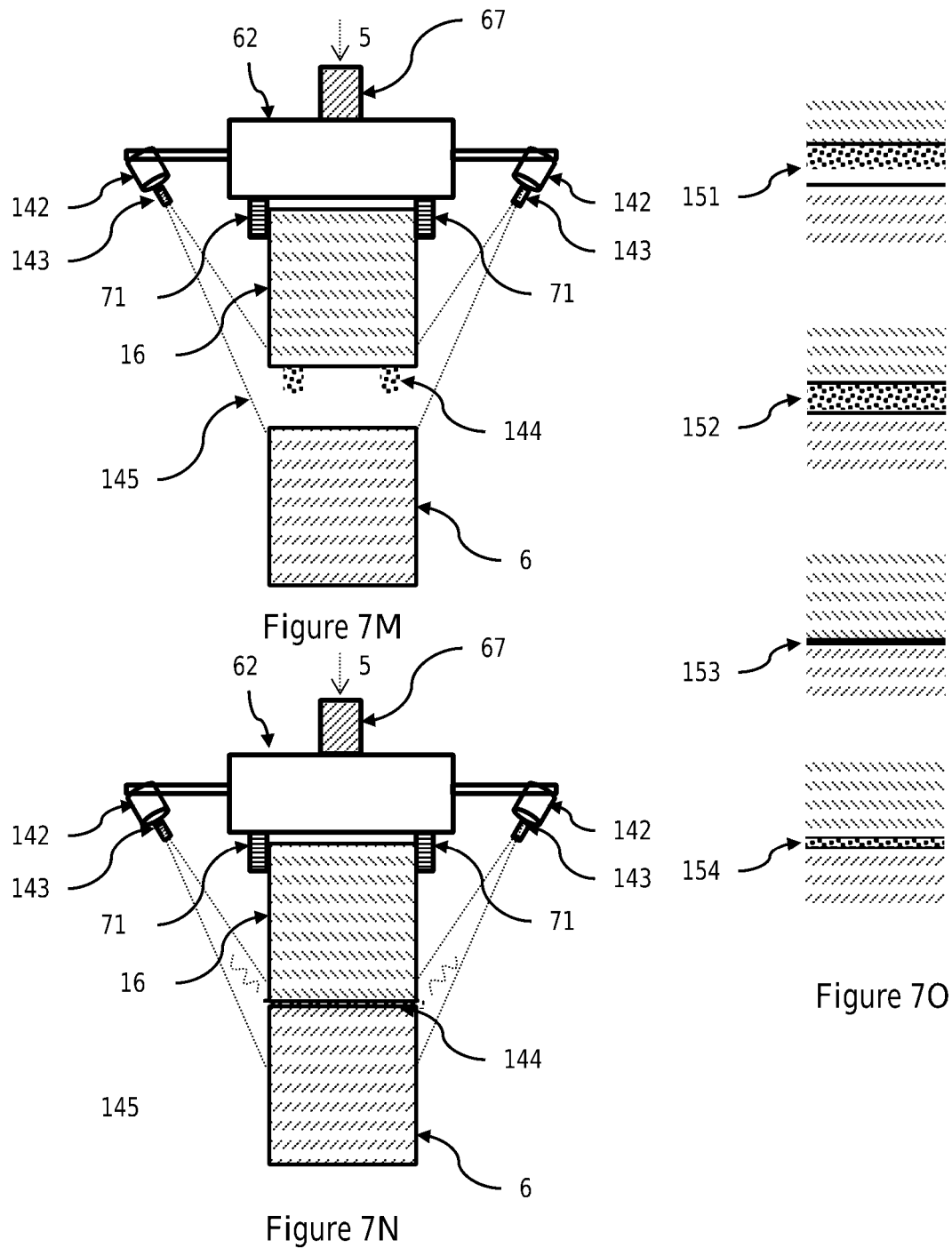

GRIPPING APPARATUS

PRIORITY DOCUMENTS

The present application is a National Stage Application of PCT/AU2019/000101, filed 29 Aug. 2019, which claims benefit from Australian Provisional Application No. 2018903192 titled "GRIPPING APPARATUS" as filed on 29 Aug. 2018 and which applications are incorporated herein by reference. To the extent appropriate, a claim of priority is made to each of the above disclosed applications.

TECHNICAL FIELD

The present disclosure relates to robotic systems. In a particular form the present disclosure relates to a gripping apparatus for controllably placing an object on a placement surface within an environment.

BACKGROUND

Autonomous and semi-autonomous industrial robotic equipment is increasingly being used in outside work environments such as on construction sites, building sites, mining sites, and industrial sites. In many cases the equipment comprises robots which can grasp, manipulate and place objects. One such system is a robotic construction robot in which a telescoping articulated arm is mounted on a truck, and a conveyor transports bricks to a layhead mounted at the end of the arm which includes a lay robot, which lays the bricks. When the brick arrives at the layhead, adhesive is applied to it and a gripper assembly of the lay robot grips it and moves it to a lay location where the brick is placed, preferably to within sub-mm accuracy. The applicant's brick laying construction robot is described in more detail in co-pending applications PCT/AU2017/050731, PCT/AU2017/050730, PCT/AU2017/050728, PCT/AU2017/050739, PCT/AU2017/050738 and PCT/AU2018/050698.

In the context of bricklaying, it is desirable to know when contact has been made between a brick being placed and a brick or structure (such as a building slab) onto which the brick is being laid.

Typically, the lay robot is programmed to place a brick at a target position within a build envelope. It would be undesirable for the brick to be released by the gripper assembly and dropped before it has been laid. Such an event may occur if for example the robot controller determines that the brick has reached the target position when in fact it may not have.

It is also undesirable for a brick to be placed onto adjoining structure with excessive force. This may occur for example if the robot controller determines that the target destination has not been reached yet and therefore keeps driving the brick further down onto the structure applying increasingly more force. This may damage the brick, the structure (i.e. wall) and/or the robotic equipment.

It is against this background, and the problems and difficulties associated therewith, that the present invention has been developed.

SUMMARY

According to a first aspect there is provided a gripping apparatus for controllably placing an object, the gripping apparatus including:

a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;

a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and, a controller configured to send a stop signal to the robot arm to stop further drive of the gripper assembly along the placement axis when the sensor output signal indicates the measured relative movement or measured force exceeds a predefined threshold.

In one embodiment, the controller is further configured to send a gripper drive control signal to the one or more gripper drive assemblies to cause the pair of opposing gripping clamps to release a gripped object in response to the sensor output signal indicating that the measured relative movement or measured force exceeds the predefined threshold.

In one embodiment, the sensor is a linear encoder.

In one embodiment, the linear encoder includes a readhead located on the connector body and a scale located on the housing or a readhead located on the housing and a scale located on the connector body.

In one embodiment, the gripping apparatus further includes at least one spring member extending from the housing to the connector body, and wherein the sensor is a force sensor configured to measure the extension of the spring.

In one embodiment, the gripping apparatus further includes at least one spring member extending from the housing to the connector body, and wherein the sensor is a distance sensor configured to measure the distance from the connector to the object being gripped.

In one embodiment, the sensor is a load cell located in series between the connector body and the gripper assembly to measure a force in a direction aligned with the placement axis.

In one embodiment, the sensor is an imaging sensor with a field of view that includes a distal side of a gripped object and further includes an excitation source, and wherein in use the gripping clamps grip an object coated on the distal side with a substance that emits light when excited by the excitation source, and a processor is configured to perform change detection on a series of images to detect when the distal side makes contact with the placement surface, and when the substance is extruded from a surface point between the distal side of the gripped object and the placement surface.

In one embodiment, either the housing includes a cavity that extends in a direction aligned with the placement axis and encompasses a flange portion of the connector body or the connector body includes a cavity that extends in a direction aligned with the placement axis and encompasses a flange portion of the housing and the sensor is configured to measure the relative movement of the flange portion within the cavity in the direction aligned with the placement axis.

In one embodiment, the sensor includes one or more limit switches, wherein at least one limit switch is located a predefined distance from an initial position of the flange portion.

In one embodiment, the sensor includes at least two limit switches, wherein at least one limit switch is located at an initial position of the flange.

In one embodiment:
the connector body includes a shaft co-axially aligned with the placement axis and a compliance plate extending in a plane orthogonal to the placement axis to define two flange portions at opposing ends of the compliance plate; and
the housing includes an upper housing mounted to a lower housing, and the gripping clamps are mounted to the lower housing, and the upper housing and lower housing define the cavity.

In one embodiment, each of the two flange portions further comprise a cut-out portion with a stop surface extending in a plane orthogonal to the placement axis and a pair of projections in the cavity walls extend into each cut-out portion such that as the housing moves relative to the connector body, the projections move in a direction aligned with the placement axis until they engage with each stop surface to define a maximum compliance distance.

In one embodiment, the sensor is a magnetic linear encoder, and a readhead is attached to the housing and a scale is mounted on the compliance plate.

In one embodiment, the sensor is configured to detect when a gripped object contacts a placement surface by measuring when at least a portion of the maximum compliance distance is reached.

In one embodiment, the connector body includes a plurality of shafts extending from the compliance plate parallel to the placement axis, and the upper housing includes a plurality of roller bearings that receive each of the shafts to thereby guide relative movement of the housing with respect to the connector body in the direction of the placement axis.

According to a second aspect, there is provided a method for controlling placement of an object using a gripping apparatus of the first aspect, including:
placing the gripped object onto the placement surface;
monitoring the sensor whilst continuing to drive the gripper assembly along the placement axis;
sending a stop signal to the robot arm to stop further drive of the gripper assembly when the sensor indicates the measured relative movement or measured force exceeds a predefined threshold; and,
sending a gripper drive control signal to the one or more gripper drive assemblies to cause the opposing gripping clamps to release the object.

According to a third aspect, there is provided a computer readable medium including instructions for causing a processor to perform the method of the second aspect.

BRIEF DESCRIPTION OF DRAWINGS

Embodiments of the present disclosure will be discussed with reference to the accompanying drawings wherein:

FIG. 4A is a side view of the lay assembly of the end effector shown in FIG. 3A according to an embodiment;

FIG. 4B is a partial perspective view of the lay assembly shown in FIG. 4A according to an embodiment;

FIG. 4C is an underside perspective view of the lay assembly shown in FIG. 4A according to an embodiment;

FIG. 5F is a top view of the gripping apparatus of FIG. 5A;

FIG. 5G is a sectional view of the gripping apparatus taken through section A-A of FIG. 5F;

FIG. 5H is a sectional view of the gripping apparatus taken through section C-C of FIG. 5F;

FIG. 7A is a schematic view of a gripper apparatus prior to placing a brick according to an embodiment;

FIG. 7B is a schematic view of the gripper apparatus of FIG. 7A whilst placing a brick according to an embodiment;

FIG. 7C is a schematic view of a gripper apparatus prior to placing a brick according to an embodiment;

FIG. 7D is a schematic view of the gripper apparatus of FIG. 7C whilst placing a brick according to an embodiment;

FIG. 7M is a schematic view of a gripper apparatus prior to placing a brick according to an embodiment;

FIG. 7N is a schematic view of the gripper apparatus of FIG. 7M whilst placing a brick according to an embodiment;

FIG. 7O is a schematic view of a sequence of images from the camera of FIG. 7M according to an embodiment.

In the following description, like reference characters designate like or corresponding parts throughout the figures.

DESCRIPTION OF EMBODIMENTS

Figure 1:
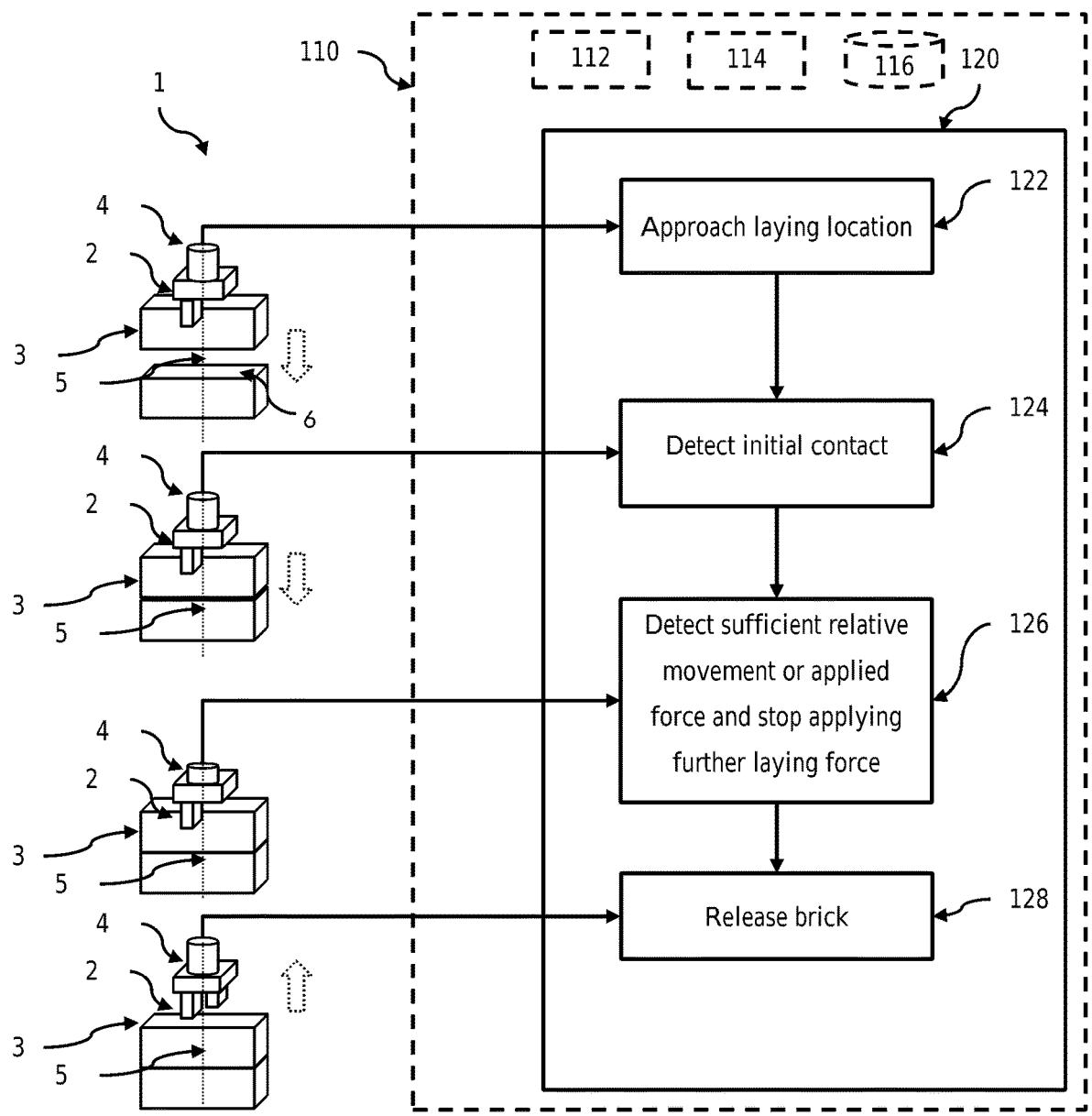
FIG. 1 is a schematic diagram of a gripping apparatus and method of use according to an embodiment.

Embodiments of a gripping apparatus and the associated control system and method will now be described. FIG. 1 is a schematic diagram of a gripping apparatus and control method according to an embodiment. The gripping apparatus 1 is for controllably placing an object in an environment, and in one particular non-limiting example, the object being placed is a brick or block for automated building construction.

The gripping apparatus 1 comprises a gripper assembly 2 mounted to a robotic arm (not shown) via a connector body 4. The gripper assembly 2 includes a housing that supports one or more gripper drive assemblies operatively coupled to a pair of opposing gripping clamps configured to grip and release an object 3 in response to one or more gripper drive control signals, and in use the robot arm is configured to drive the gripper assembly along a placement axis 5 towards a placement surface 6 via the connector body 4.

A sensor is configured to either measure a relative movement between the gripper assembly 2 and the connector body 4 in a direction aligned with the placement axis 5 or to measure a force (such as a reaction force) between the gripper assembly 2 and the connector body 4 in a direction aligned with the placement axis 5, wherein the sensor generates a sensor output signal based on the measurement. A controller 110 is configured to send a stop signal to the robot arm to stop further drive of the gripper assembly 2 along the placement axis 5 when the sensor output signal indicates the measured relative movement or measured force exceeds a predefined threshold.

The controller or control system 110 may be an electronic circuit, a microprocessor or computing apparatus comprising one or more processors 112 and a memory 114 comprising instructions to implement embodiments of the control method 120 described herein. The controller 110 sends a gripper drive control signal to the one or more gripper drive assemblies to cause the pair of opposing gripping clamps to grip an object. The controller (or an associated controller) is configured to drive robot arm to approach a laying location at step 122. The robot arm then drives the gripper assembly along a placement axis towards the placement surface. In one embodiment the control system is configured to detect initial contact of the gripped object with the placement surface at step 124. The control system continues to monitor the sensor whilst continuing to drive the robot arm until the sensor indicates the measured relative movement or the measured force exceeds a predefined threshold, an in response the controller sends a stop signal to the robot arm to stop applying further laying force at step 126. Finally the object (e.g. a brick) is released at step 128 and the gripper assembly is driven away from the laying location.

Figure 2A:
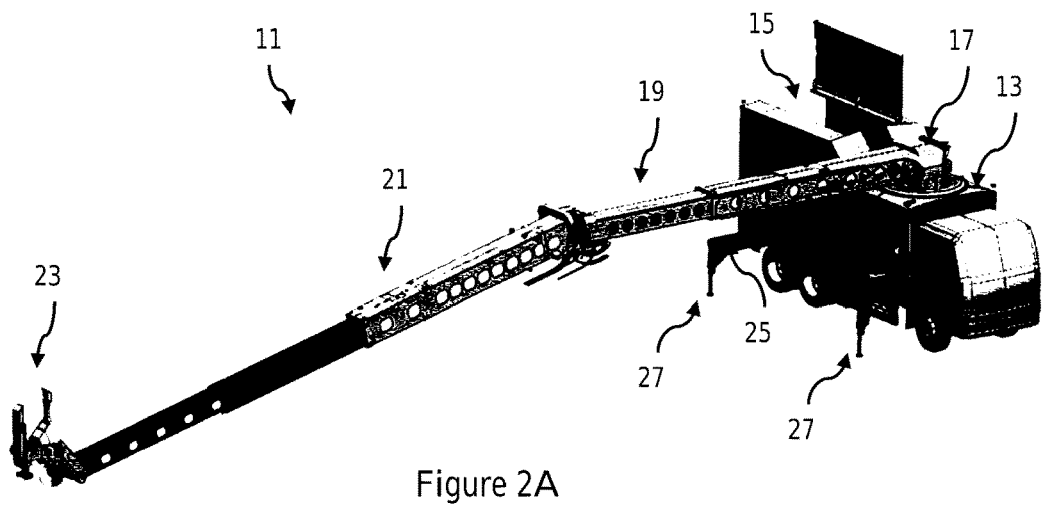
FIG. 2A is a perspective view of a bricklaying robot according to an embodiment.
Figure 2B:
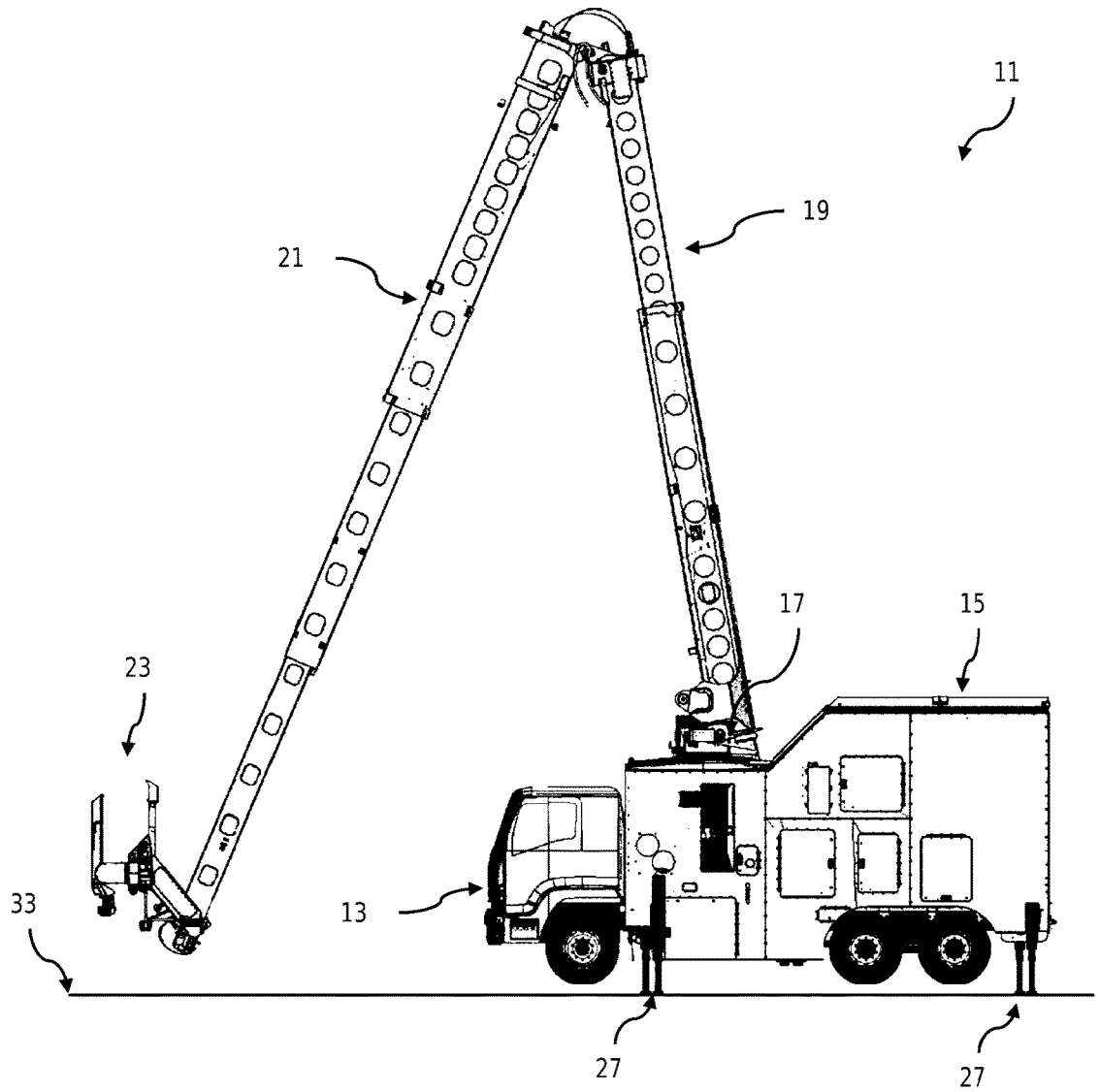
FIG. 2B is a side view of the bricklaying robot of FIG. 2A with telescopic arm partially folded.

To further illustrate aspects and advantages of the gripping apparatus, control system and method, a bricklaying robot using an embodiment of the gripping apparatus will now be described with reference to the accompanying figures. FIG. 2A is a perspective view of a bricklaying robot according to an embodiment and FIG. 2B is a side view of the bricklaying robot of FIG. 2A. The bricklaying robot comprises an automated arm 11 comprising an internal conveyor that conveys a brick 16 (the object) to an end effector 23 in the form of adhesive applying and brick laying head (referred to as the layhead).

In this embodiment automated brick laying robot machine 11 has a base 13 in the form of a truck with a turntable in the form of a tower (or turret) 17 supported on a vertical yaw axis, and an articulated arm having a telescoping boom 19 supported on the tower 17 about a horizontal pitch axis about which the arm may be raised or lowered. The boom 19 has a telescoping stick 21, mounted on the end of the boom 19 about a horizontal pivot axis, and an end effector 23 in the form of an adhesive applying and brick laying head 23 mounted to the remote end of the stick 21. For the sake of convenience, we will refer to the end effector/adhesive applying and brick laying head simply as the layhead. The base 13 is stabilised relative to the ground 33 by legs 25 with jack-down feet 27. Bricks are stored in a storage area 15 of the truck and a conveyor inside the arm conveys the bricks from the truck 13 to the layhead 23.

Figure 3A:
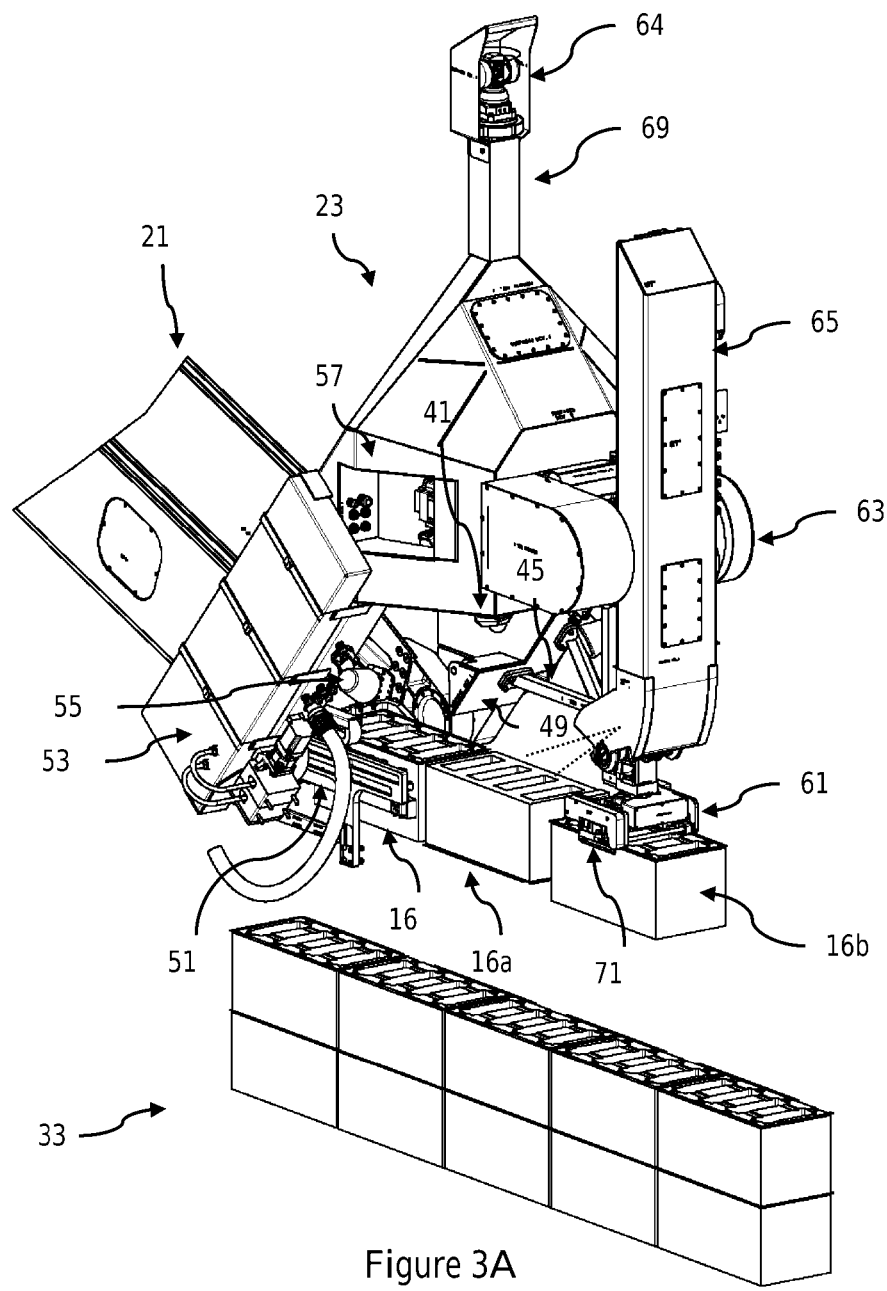
FIG. 3A is a perspective view of the end effector of the bricklaying robot of FIG. 2A according to an embodiment.

When the brick arrives at the layhead 23, it is picked up by a 'flipper' clamp 51 (as shown in FIG. 3A) which holds the brick while adhesive is applied and then flips it 180 degrees and presents the brick for pickup by an embodiment of the gripper assembly 61 at one end of a lay arm 65 (e.g. robot arm). However, it is to be understood that this embodiment is illustrative and in other embodiments the robotic equipment could comprise handling equipment such as grippers which are arranged to hold components in an assembly operation, and the objects could be a rectangular, cylindrical or regular polygonal shaped object. In some embodiments the control system 110 comprises a computing apparatus located in the truck 11 comprising one or more processors 112 and a memory 114, and are in communication with a sensor and drive assemblies on the lay arm 65 and gripper assembly 61, and are configured to control the operation of the gripping clamps 71.

Figure 3B:
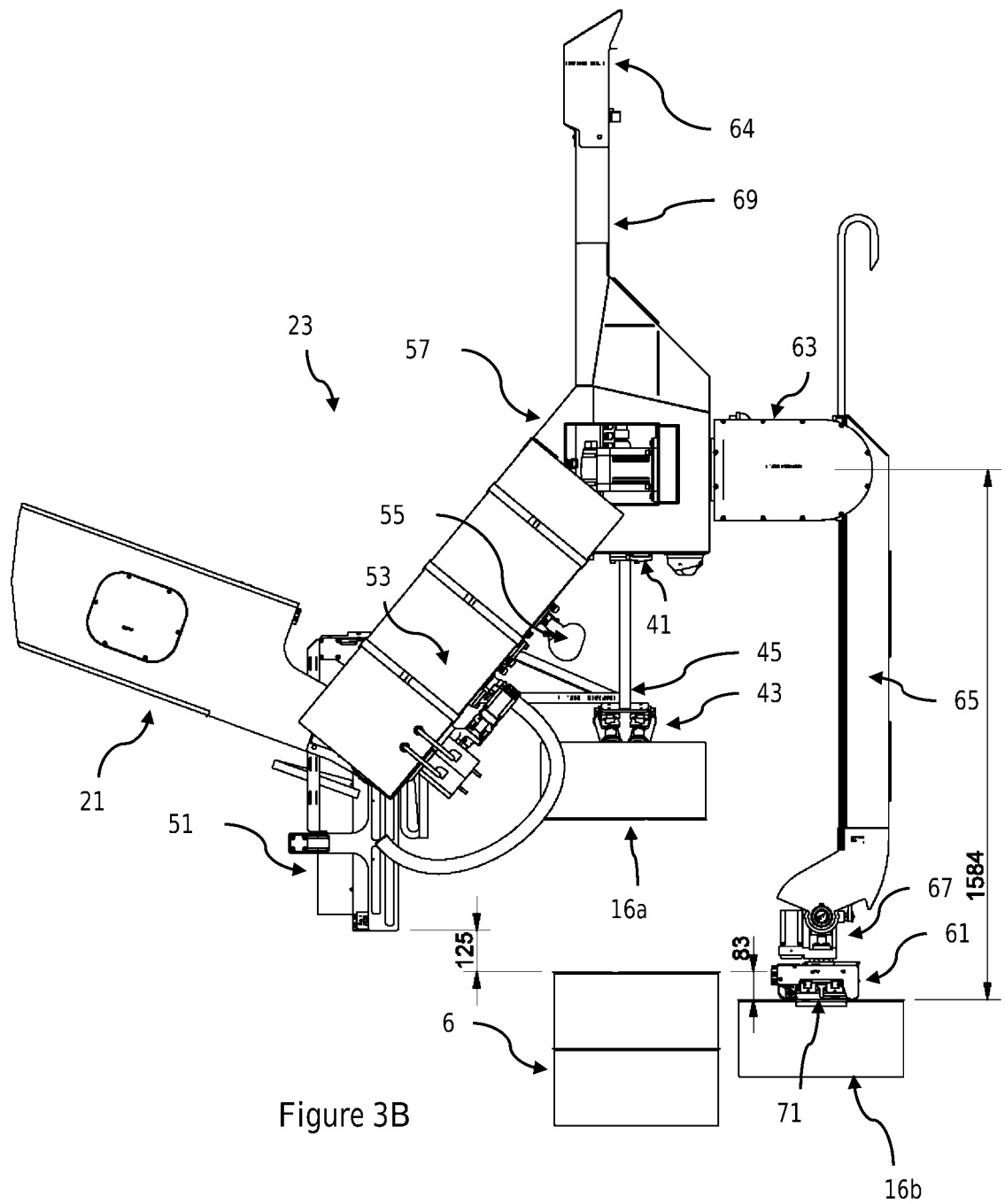
FIG. 3B is a side view of an end effector according to an embodiment.

FIG. 3A is a perspective view of the end effector of FIG. 2A, and FIG. 3B is a side view of an end effector according to an embodiment. As mentioned above, the brick is transported to the layhead 23 where a robotically controlled flipper assembly 51 having a clamp that receives (grasps) the brick 16 and holds it so that an adhesive can be applied using an adhesive dispensing system. Then the brick is flipped 180 degrees and presented for pickup (brick 16a) by the lay arm 65 that grasps the brick using gripper assembly 61 and places the brick (16b) at the desired location on wall 6 under control of a control system 110. A vision system is used to determine the precise 6DOF (x, y, z, a, b, c) location of the brick in the local coordinate system of the robot. The lay arm 65 uses the 6DOF location to precisely grip and take the brick (16b) from the jaws of the flipper assembly 51 using gripping clamps 71 and moves it to a position where it is laid on wall 6. The lay arm 65 also compensates for movement of the boom, so that the brick is laid in the correct position using a stabilisation and tracking system.

The layhead 23 comprises a body 57 with arms 49 and 51 forming a clevis which extends obliquely downward from the body 57. The arms 49 and 51 have apertures that receive pins to pivotally mount the head 23 and the flipper assembly 71 about a horizontal axis at the distal end of the stick 21. The layhead 23 articulates about a horizontal axis substantially parallel to the articulation axis of the stick 21 and the articulation axis of the boom 19. The pose of the layhead 25 is controlled by movement of a ram. A first camera assembly 41 is mounted on the body 57, a second camera assembly 43 is mounted on first arm 49 and an adhesive container and adhesive application system 53 is located on arm 51. Lights 47 and 53 are mounted to arms 49 and 51. A tracker component 64 is located on a mast 69 extending from the body 57 of the layhead. An additional reference tracker component may be set up on the ground 33 adjacent to the robot. The tracker component 64 may be a Leica T-Mac or an API STS (Smart Track Sensor). Alternately tracker component 130 may be a single SMR (Spherical Mount Reflector) or corner cube reflector, or two or three SMRs or corner cube reflectors or a Nikon iGPS or any other suitable tracking device mounted to the layhead. Preferably the tracker component 64 provides real time 6 degrees of freedom position and orientation data at a rate of 1000 Hz or more. The layhead 23 may support a camera or laser distance scanner that views the ground 33, objects below the layhead, and determines the location of the layhead or brick laying head 65 with respect to the ground 33. As the layhead lays a brick 16, the vision system, another camera or a laser scanner mounted on the layhead may be used to measure the laid brick position so that the height of the laid brick is stored and later used to adjust the laying height of the dependant bricks that are laid on top of it on the next course.

FIG. 4A is a side view of the lay assembly (or lay arm 65) of the end effector shown in FIG. 3A according to an embodiment. FIGS. 4B and 4C are partial perspective and underside perspective views of the lay assembly shown in FIG. 4A according to an embodiment. In this embodiment the lay arm 65 is a spherical geometry robot comprising a linearly extendable arm with a gripper assembly 61 in the form of a pair of opposing gripping clamps 71 fitted at the lower end of the arm. The linearly extendable lay arm 65 is mounted to body 57 via a mount 63 comprising a rotator and a yoke. The arm 65 has linear guides which co-operate with bearing cars on the base of the mount to guide linear extension of the arm relative to the mount, to allow the arm 65 to move in a direction (typically straight up and down, but this depends on the pose) normal to the axis of the clevis of the mount in order to provide sliding movement of the arm 65. This linear extension of the arm is controlled by a servo motor attached to the base of the mount with reduction drive pulleys connected by a toothed belt driving a pinion engaging a rack located extending along the arm 65. A wrist 67 comprises a servo motor controlled mechanism to provide the gripper assembly 61 yaw angle adjustment (about the Z or placement axis); wrist pitch angle adjustment 68; and wrist roll angle adjustment 69. The gripping clamps (jaws) 71 of the gripper assembly 61 are independently movable by servo motors to allow the offset gripping of a brick. The wrist 67 acts as a connector body to the drive assemblies in the lay arm 65 that drive the gripper assembly along the placement axis (Z-axis).

In one embodiment the lay arm 65 is mounted to a gearbox that provides rotation about the X-Axis. In one embodiment the gearbox is a TS240 Twin Spin gearbox in which rotation of the twin spin gearbox is by means of a belt drive configuration, powered by a single self-contained 2.2 kW LS Mecapion servo motor and driven via an Elmo Solo Guitar servo drive. The lay arm yoke houses the equipment to control rotation of the lay arm rotator (Y-Axis rotation), this is powered by a single self-contained 3.0 kW LS Mecapion servo motor and driven via an Elmo Solo Guitar servo drive. This servo motor drives a TS240 Twin Spin gearbox via a belt drive configuration to produce rotation in the rotator on one end, an on the other a hollow spigot locates in a sealed cylindrical roller bearing that is housed in the Yoke. The yoke serves as a stiff platform for the rotator to revolve internally. The lay arm rotator houses the equipment to control the lay arm Z-Axis translation. The rotator contains a protruding spur gear (for running on the rack on the lay arm case) on a drive shaft, captured in three roller bearings this is in turn driven by a belt drive configuration with a reduction ratio pulley set. The belt and pulleys are powered by a single self-contained LS Mecapion servo motor and driven via an Elmo servo drive. The external flat face of the rotator houses four linear bearing cars for travel along the lay arm case.

The lay arm 65 comprises drive assemblies which in one embodiment comprise three servo drives and other electrical connection components. The servo drives control the servo motors located at the joints. The lay arm 65 contains a TS70 Twinspin Gearbox to control rotation about the Y-Axis for wrist joint 68. Rotation of the Twin Spin gearbox at wrist joint 68 is by means of a belt drive configuration, powered by a single self-contained 2.2 kW LS Mecapion servo motor and driven via an Elmo Solo Guitar servo drive (inside the lay arm case). The back face of the case is a precision machined plate and holds the rack and linear rails that engage with the rotator. The lay arm wrist 67 contains components that control both roll 69 about X-Axis and yaw about Z-Axis (the placement axis). Roll 69 is controlled via a belt driven TS70 Twinspin Gearbox, powered by a single self-contained 0.4 kW LS Mecapion servo motor and driven via an Elmo Solo Whistle servo drive. The end opposite the gearbox is a spigot engaged with a sealed roller bearing to provide stable roll. Z axis (placement axis) yaw of the lay arm gripper is controlled via a belt driven TS70 Twinspin Gearbox, powered by a single self-contained 0.4 kW LS Mecapion servo motor and driven via an Elmo Solo Whistle servo drive. The driveshaft on this TS70 is hollow to accommodate electrical services wiring, a full rotation slipring (Orbex 41218-02) with a maximum rotational speed of 300 rpm abuts the drive shaft to conduct wiring through the hollow driveshaft whilst the wrist is yawing. The stator of the slipring is mounted to the wrist and the rotor mounts inside the hollow driveshaft tube to protect the electrical wiring during rotation. All compensation from feedback and flexibility in the boom is removed via movements of the joints in the layhead 23. The laytower 69 will remain Z-Axis aligned to gravity whilst the lay arm 65 stabilizes (yaw, pitch, roll, translates) to minimise any brick movement. This will allow the brick 16 to be placed with a high degree of accuracy on the wall 6.

Figure 5A:
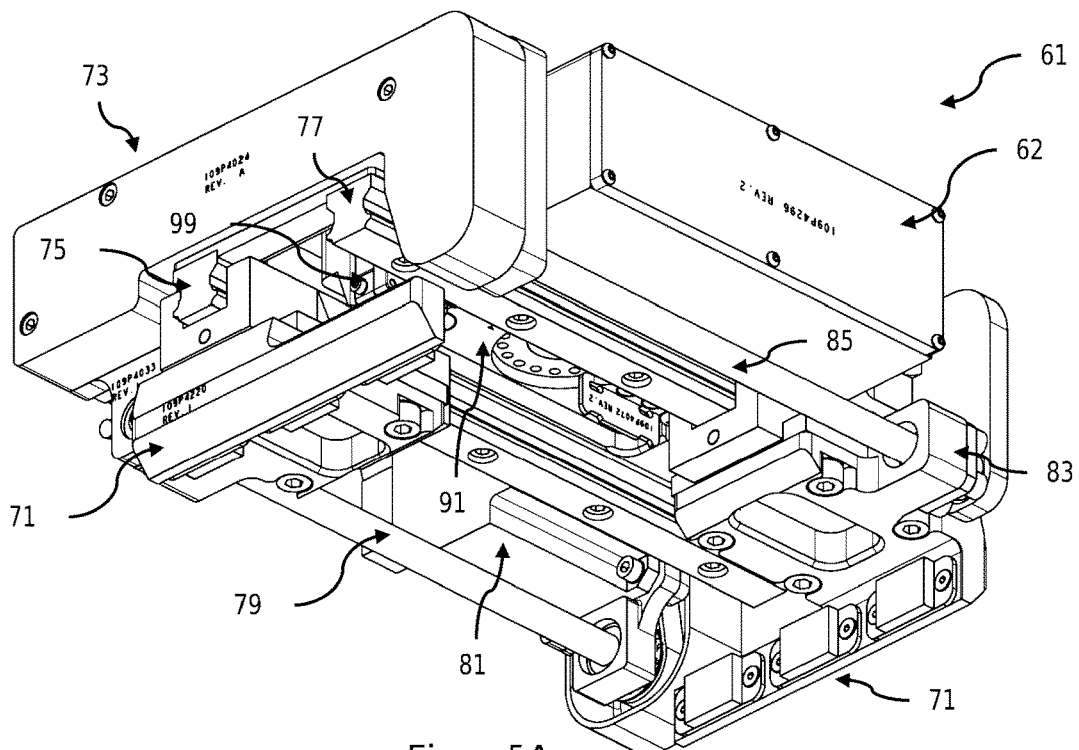
FIG. 5A is an underside perspective view of the gripping apparatus shown in FIG. 4A according to an embodiment.
Figure 5B:
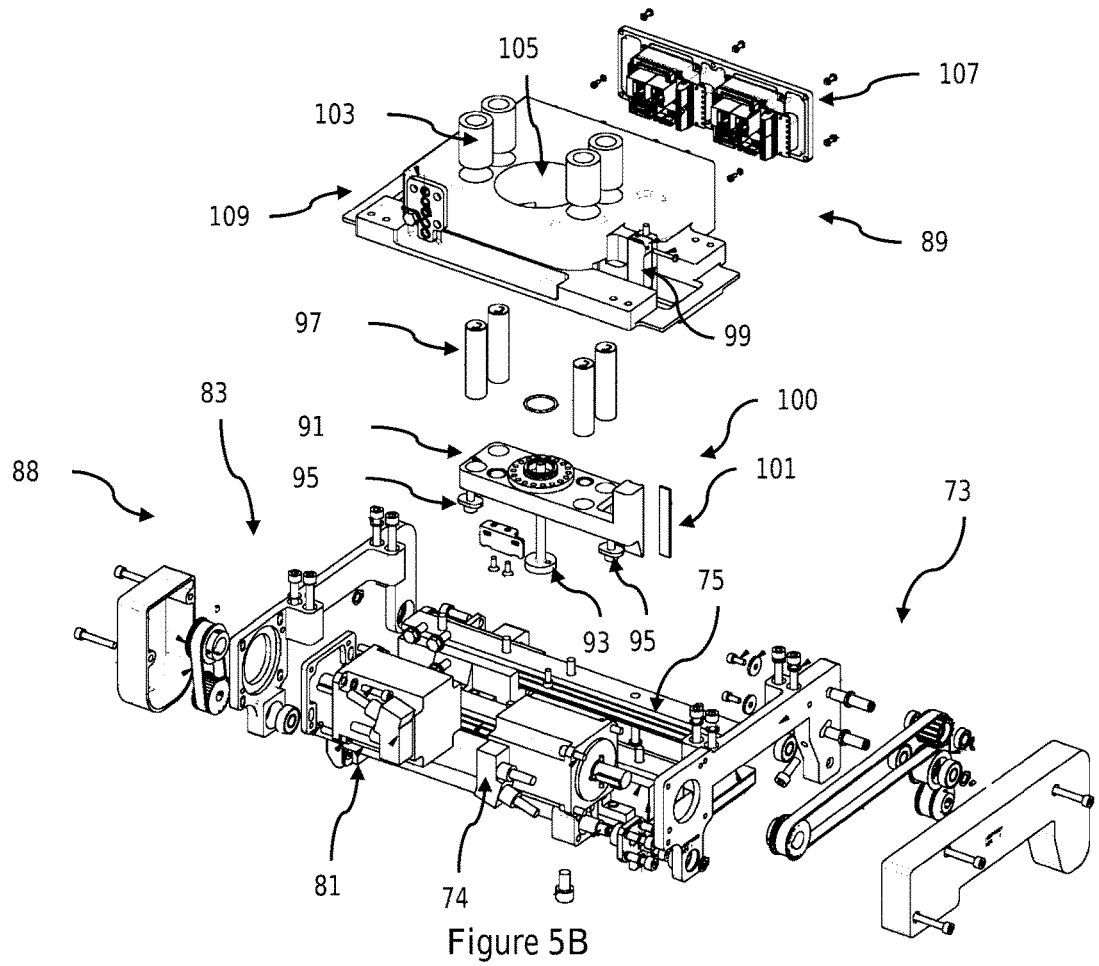
FIG. 5B is an exploded view of the gripping apparatus of FIG. 5A.
Figure 5C:
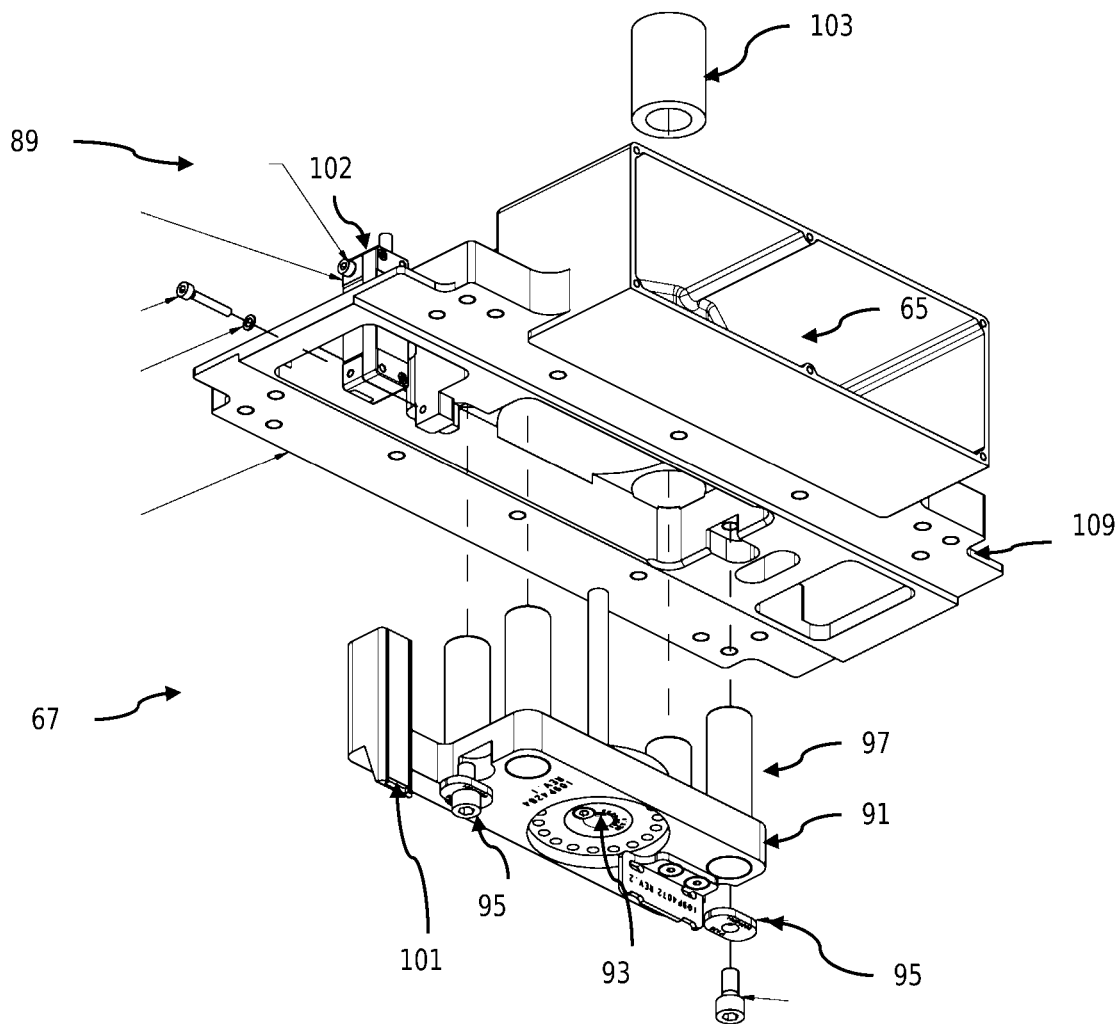
FIG. 5C is an exploded view of a compliance plate being received in an upper housing of the gripping apparatus of FIG. 5A.
Figure 5D:
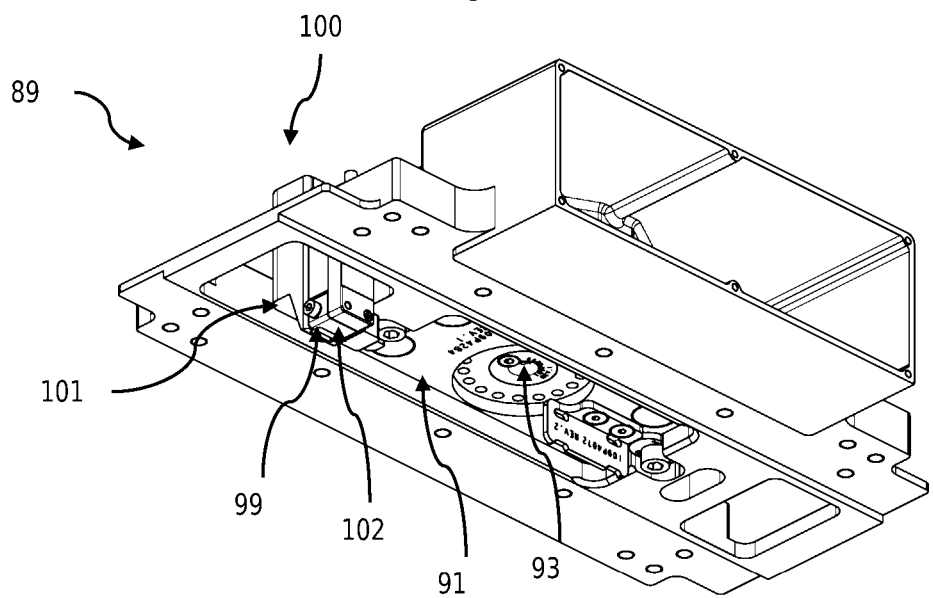
FIG. 5D is an assembled view of the compliance plate in the upper housing of the gripping apparatus of FIG. 5A.
Figure 5E:
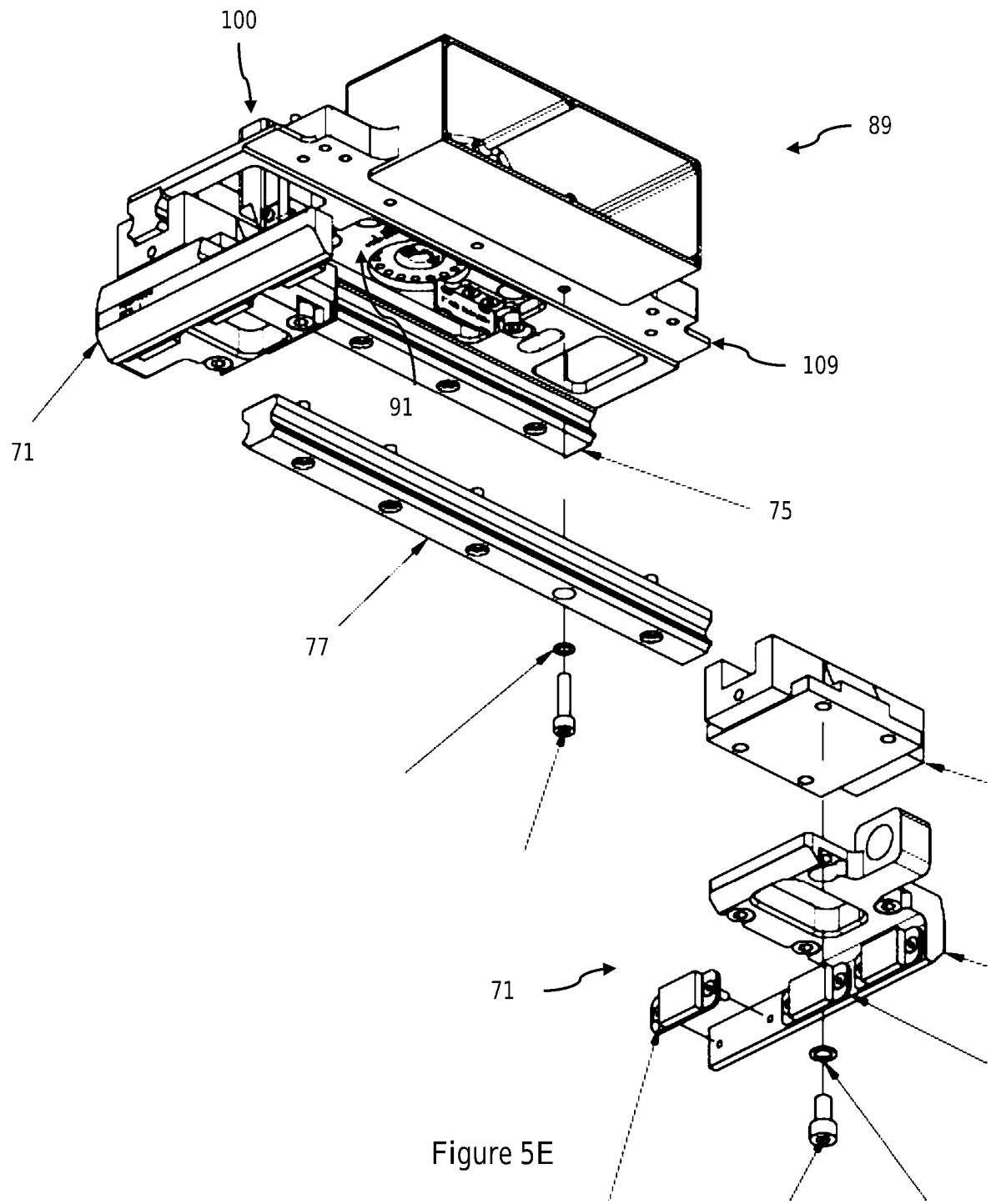
FIG. 5E is an exploded view of a lower housing comprising a pair of opposing gripping clamps relative to the upper housing of the gripping apparatus of FIG. 5A.

FIGS. 5A to 5H shows various views of a lay arm gripper assembly 61 according to an embodiment. In this embodiment the lay arm gripper assembly 61 contains components for gripping and releasing bricks in a housing 62 formed from an upper housing 89 and lower housing 88 that partially enclose a compliance plate 91 forming part of the connector body 67. The upper housing is shown in more detail in FIGS. 5A and 5D, with FIG. 5D showing how the compliance plate 91 is received in a cavity formed in the upper housing 89. The lower housing 88 is formed from the slide rails and working parts of the gripping clamps 71 and associated motor and gear components. A sensor 100 in the form of a magnetic encoder is used to feedback (to the control system 110) when the brick 16 is placed on the wall and the available compliance in the gripper 61 has been at least partially used to trigger a stop signal and gripper release signal. In this embodiment the gripper assembly 61 has Z-Axis (placement axis) compliance via four short linear bearing rods 97 extending up from the compliance plate 91 and four linear roller bearings 103 located in apertures in upper housing 89. The upper housing 89 and lower housing 88 define a cavity within which the compliance 91 plate is located, and thus allows relative movement between the gripper assembly 61 and the connector body 67 in the Z axis (placement axis). In this embodiment compliance in Z-Axis is approximately 8 mm and an encoder strip 101 (e.g.

Renishaw AS10A0060B00) is mounted on the compliance plate 91 of the connector body (wrist) adjacent to a magnetic linear encoder read head 99 (e.g. a Renishaw LA11SCB08BK10DF00) mounted to the housing 62 to read the amount of vertical displacement along the Z-Axis (placement axis). As lay arm 65 holds the brick (prior to placement) the compliance in the gripper is at full extension. Then, as the lay arm 65 drive the gripper assembly 61 to place the brick 16 on a placement surface 6, the force from placing the brick pushes the magnetic encoder 99 up the encoder strip 101 telling the control system 110 that the brick is ready for release. Stops 95 limit the maximum compliance (ie maximum relative movement between the gripper assembly 61 and the connector body 67). A shaft 93 extends through the compliance plate in the Z axis (placement axis) where it passes through an aperture 105 in the upper housing 89 where it is received in the wrist (connector body) 67 and provides yaw control.

There are two clamping arms 71 (or grippers) that are controlled via two motor assemblies comprising two separate belt drive configurations 73 and 83, each powered by a single self-contained 0.1 kW LS Mecapion servo motor 74 81 and driven via an Elmo Solo Whistle servo drive 107 mounted in the gripper housing 62. The belt drives turn a lead screw 79 and 85 that translates the carriage and gripper clamps 71. The carriage is comprised of a linear bearing car attached to the gripper and this runs on a linear bearing rail 75 and 77.

Figure 6A:
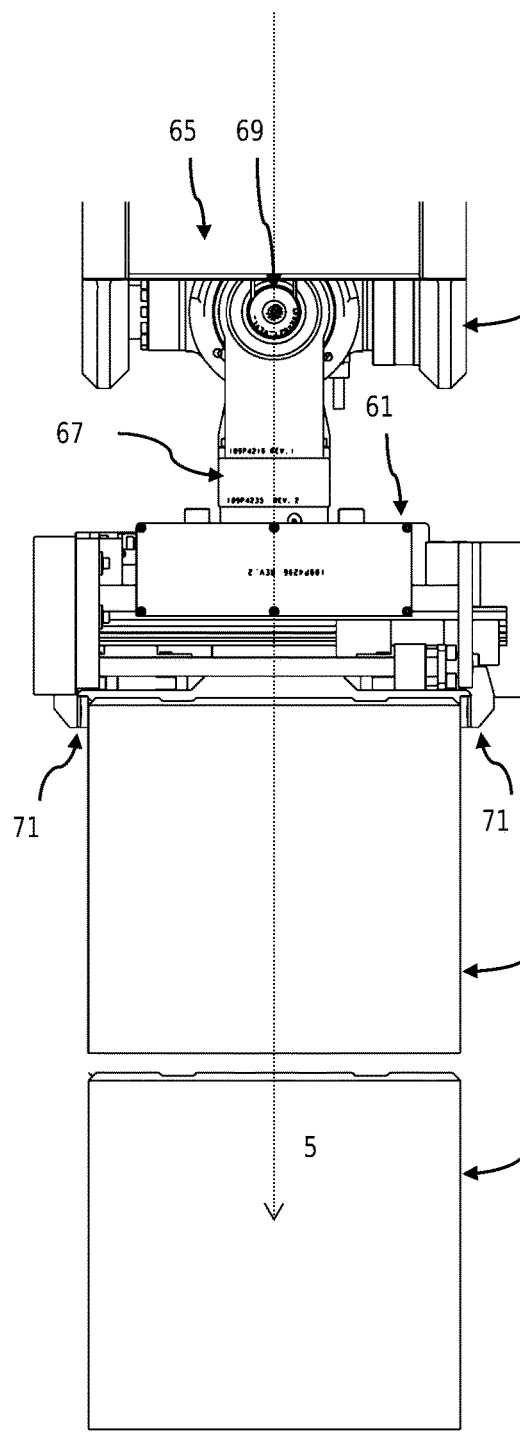
FIG. 6A is an end view of the gripping apparatus prior to placing a brick according to an embodiment.
Figure 6B:
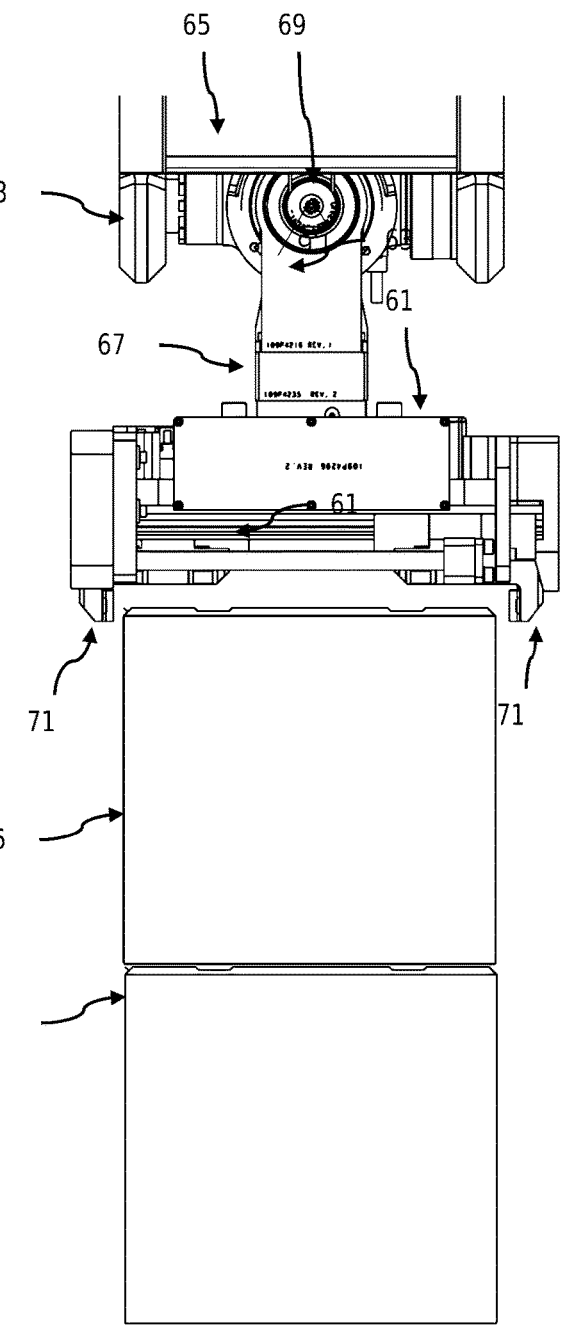
FIG. 6B is an end view of the gripping apparatus after placement and release of a brick according to an embodiment.
Figure 6C:
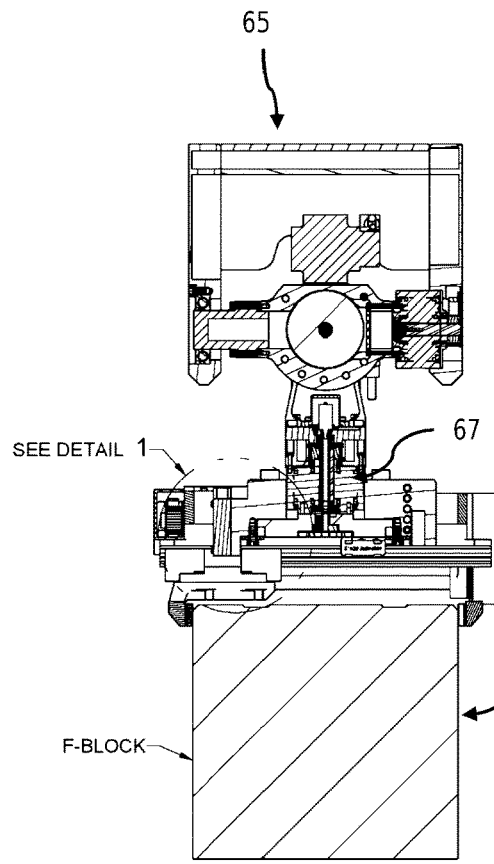
FIG. 6C is a section through the gripping apparatus prior to placement of a brick.
Figure 6D:
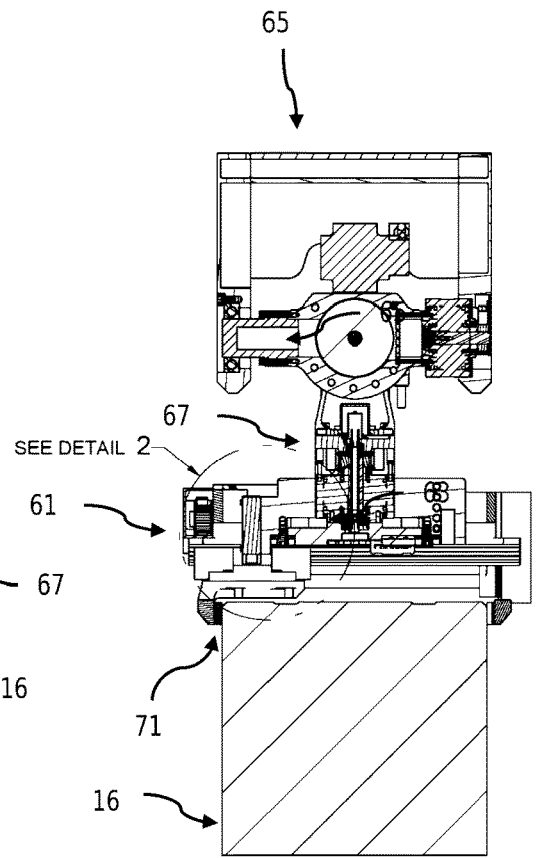
FIG. 6D is a section through the gripping apparatus at the maximum compliance distance.
Figure 6E:
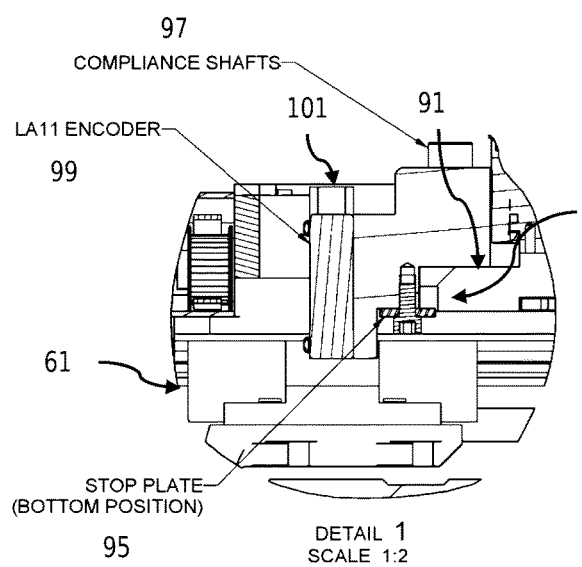
FIG. 6E is a close-up section view of Detail 1 of FIG. 6C.
Figure 6F:
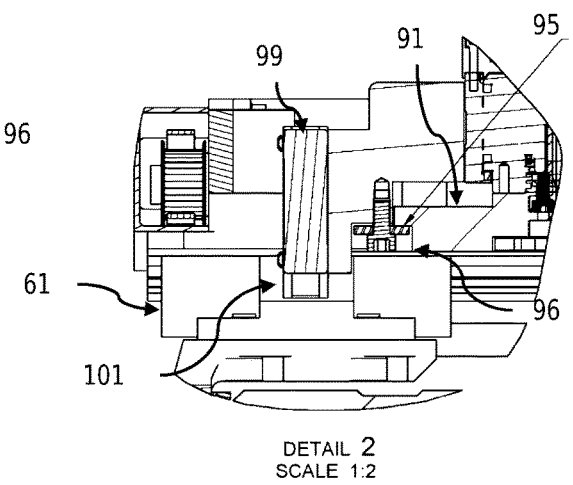
FIG. 6F is a close-up section view of Detail 2 of FIG. 6D.

As shows in FIGS. 5G, and 6C to 6F, the compliance plate 91 is formed with a cut out portion 96. Similarly the interior walls of the cavity in the housing are formed with a corresponding cut out portion, and a projection in the form of a flanged stop plate 95 that rests on or is mounted to a lower surface of the cavity. As the housing moves relative to the compliance plate 91, the flanges of the stop plate 95 move upwards in the cut-out potion 96 of the compliance plate 91, until they are stopped by a stop surface in the cut-out portion to define a maximum compliance distance. The stop surface is in the X-Y plane (ie orthogonal to the Z placement axis). In this embodiment, and as can be seen in FIGS. 6E and 6F the linear encoder detects the relative vertical (Z axis) movement. The linear encoder is a magnetic linear encoder, in which a readhead 99 is attached to the upper housing 89 and a magnetic scale 101 is attached to the compliance plate 91 (connector body).

However various modifications and variations are possible as shown in FIGS. 7A to 7O. FIG. 7A is a schematic view of a gripper apparatus prior to placing a brick according to an embodiment, and FIG. 7B is a schematic view of the gripper apparatus of FIG. 7A whilst placing a brick according to an embodiment. In this embodiment the housing 62 forms a cavity 92 within which a connector body 67 (eg compliance plate) can move vertically. In this embodiment the dimensions of the cavity limit the movement of the connector body along the Z axis (placement axis) but in other embodiments rails or compliance shafts 97 and bearings similar to those shown in FIGS. 5A to 5H may be used to limit relative movement of the connector body with respect to the housing to the Z axis. A sensor 100 in the form of a linear encoder is located in the interior wall to detect relative movement. In other embodiments other sensors may be used including optical sensors that detect passing of the connector body. As shown in FIG. 7B, once contact between the brick 16 and surface 6 has been made, further driving of the connector body 67 by the drive assembly 4 results in the housing sliding past the connector body in the opposite direction to the drive force (ie move upwards whilst the connector is driven downwards). The sensor can detect the amount of relative movement and the control system can then issue a stop command once the amount of relative movement exceeds a threshold.

FIGS. 7C and 7D show another embodiment using limit switches. In this embodiment, the connector body 70 encloses the gripping housing 62 which initially rests (under gravity) on the lower surface of the cavity in the connector body. In this embodiment the sensor is a pair of limit switches located on the upper surface of the cavity. Once contact between the brick 16 and surface 6 has been made, further driving of the connector body 67 by the drive assembly 4 results in the housing sliding upwards within the cavity in the opposite direction to the drive force (ie move upwards whilst the connector is driven downwards) until it contacts limit switches 100. These send a signal to the control system indicating sufficient relative movement has occurs so a stop signal can be issued.

Figure 7E:
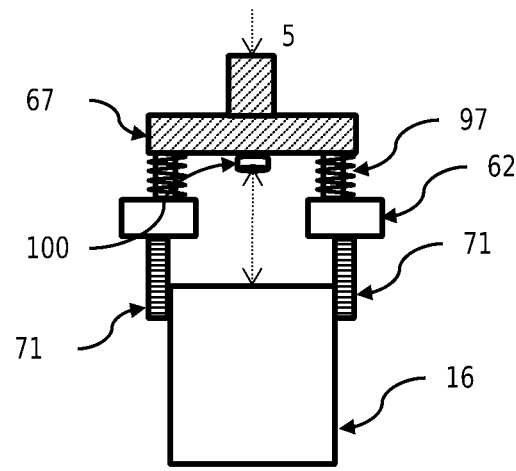
FIG. 7E is a schematic view of a gripper apparatus prior to placing a brick according to an embodiment.
Figure 7F:
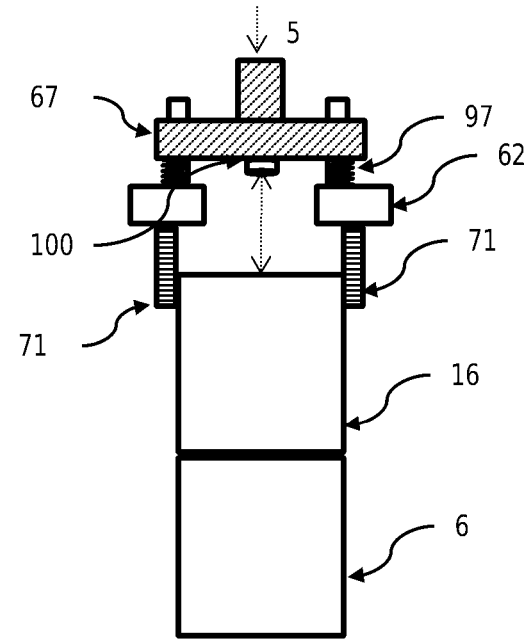
FIG. 7F is a schematic view of the gripper apparatus of FIG. 7E whilst placing a brick according to an embodiment.

FIGS. 7E and 7F show another embodiment showing a distance ranging sensor. In this embodiment the connector body 67 is connector to a housing 62 via compression springs 97. In other embodiments similar elastic members could be used. A distance ranging sensor 100, such as a laser diode based sensor, or ultrasonic transducer is mounted on an underside of the connector and measures the distance from the underside of the connector (or a fixed reference point with respect to the connector) to the brick surface. Once contact between the brick 16 and surface 6 has been made, further driving of the connector body 67 by the drive assembly 4 results in compression of springs 97 and a reduction in the distance from the underside of the connector to the brick surface 16. The control system can measure the distance measurements and once a threshold reduction in the relative distance occurs, a stop signal can be sent to the drive assemblies (and optionally a grip release signal).

Figure 7G:
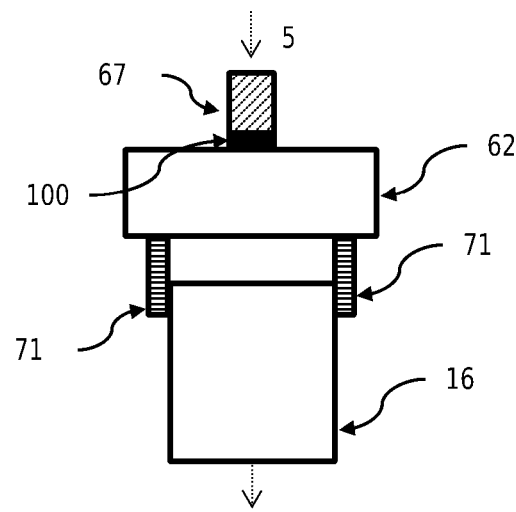
FIG. 7G is a schematic view of a gripper apparatus prior to placing a brick according to an embodiment.
Figure 7H:
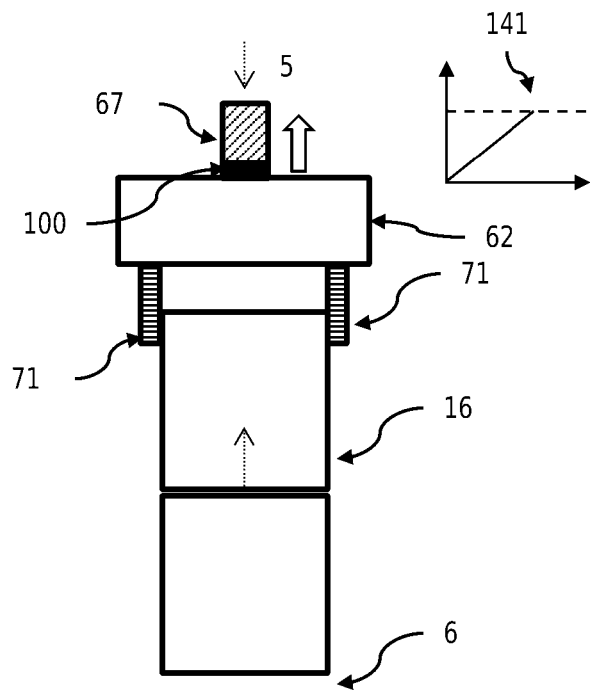
FIG. 7H is a schematic view of the gripper apparatus of FIG. 7G whilst placing a brick according to an embodiment.

The above examples illustrate sensors configured to measure changes in the relative distance between the connector body and the housing. However in other embodiments force sensors may be used to measure a force between the gripper assembly and connector body in direction aligned with the placement axis. For example in the above embodiment, rather than using a distance ranging sensor, a force sensor may be used to measure the extension (or compression) of the spring. FIGS. 7G and 7H illustrate an embodiment in which a force sensor, such as a strain gauge based load cell, is placed in series between the connector body 67 and the housing 62. This is configured to measure the Z axis force. In this embodiment, as the brick 16 is placed on the surface 6 a reaction force will be transmitted back through the housing and connector body. Thus in this embodiment the control system monitors the force measured by the load cell, and when it detects a Z axis reaction force of sufficient magnitude (ie it exceeds a threshold), a stop signal is issued by the control system. This is illustrated in schematic graph 140.

Figure 7I:
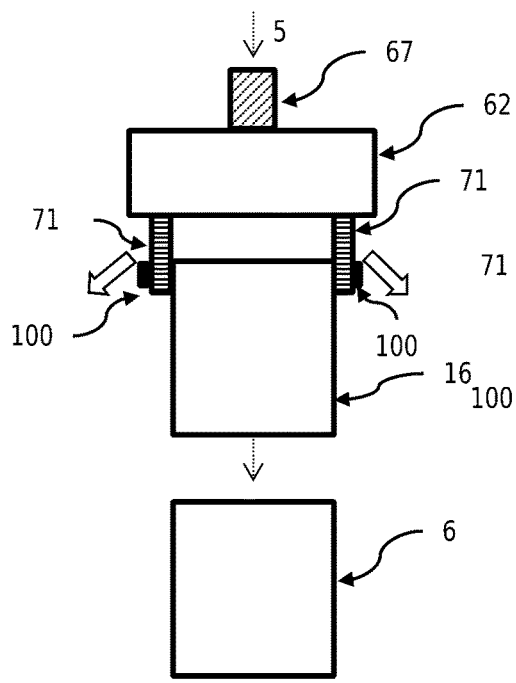
FIG. 7I is a schematic view of a gripper apparatus prior to placing a brick according to an embodiment.
Figure 7J:
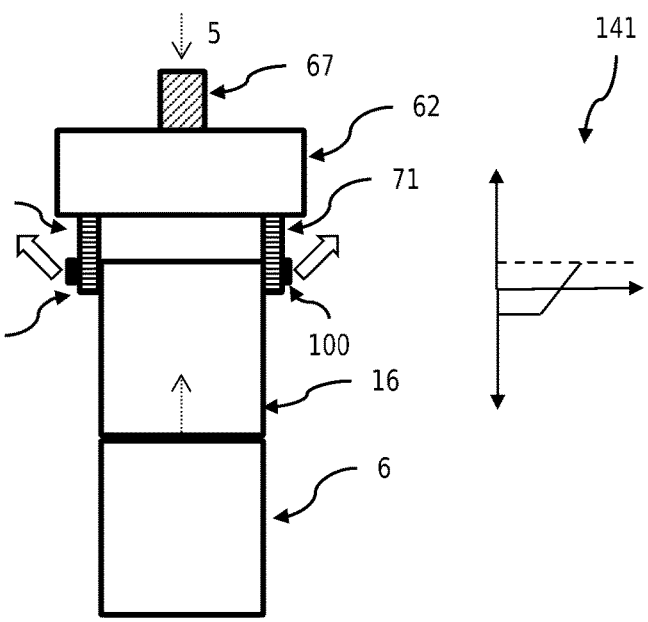
FIG. 7J is a schematic view of the gripper apparatus of FIG. 7I whilst placing a brick according to an embodiment.

FIGS. 7I and 7J show another variation in which a force sensor, such as a strain gauge is mounted on the gripping clamps 71. In this embodiment the sensor monitors the Z axis force as measured by the strain gauge. In FIG. 7I, the direction of the Z axis force is shown prior to contact of the brick with the surface. However, as shown in FIG. 7J, once the brick contacts the surface (and drive force is maintained), the reaction force on the clamps in the Z axis direction will increase in the opposite direction. The control system can measure the Z axis component and trigger a stop signal when it exceeds a threshold value.

Figure 7K:
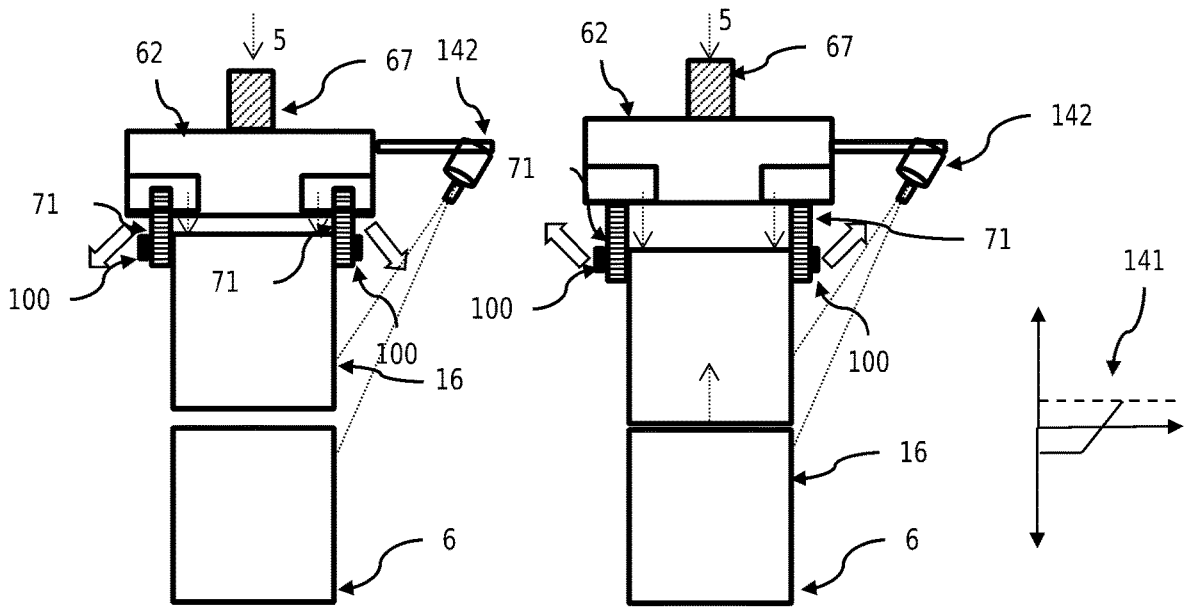
FIG. 7K is a schematic view of a gripper apparatus prior to placing a brick according to an embodiment.
Figure 7L:
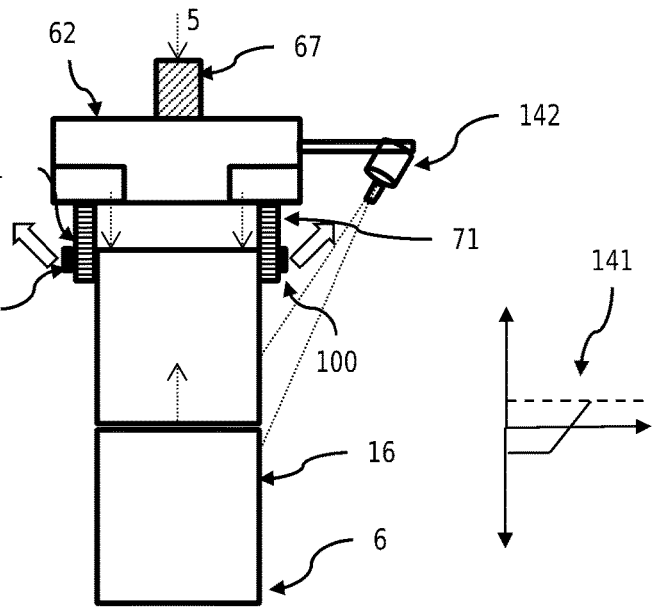
FIG. 7L is a schematic view of the gripper apparatus of FIG. 7K whilst placing a brick according to an embodiment.

In the above embodiments, the robot arm 65 drives the connector body 67. FIGS. 7K and 7J show another variation in which a first drive assembly drives the gripper apparatus towards the brick. A camera system 142 or distance ranging systems detects when the brick 16 is close to the placement surface. Then drive assemblies in the gripping clamps 71 drive the gripping clamps in a Z direction to drive the brick towards the placement surface. In this embodiment the force sensor shown in FIGS. 7I and 7J is used to detect when contact occurs, and sufficient force has been applied. This provides a two stage placement method (eg a coarse/fine control system)

FIGS. 7M, 7N and 7O show an embodiment using an imaging sensor to indirectly determine when sufficient force has been applied. In this this embodiment a pair of camera sensors 142 is located on supports extending laterally from the housing 62. Additionally an excitation light source 143 is mounted with the camera to illuminate the field of view 145 of the camera. The excitation light source is selected to cause an adhesive 144 located on the lower surface of the brick 16 to fluoresce or emit radiation when excited by the excitation light source. As shown in FIG. 7N, once the brick 16 contacts the surface, the adhesive 144 is extruded out of the gap between the bricks. This then emits light which can be detected by the camera sensor. Automated image processing of the images can detect when a line of fluorescence is observed indicating sufficient force has been applied (ie based on the amount of extruded adhesive). FIG. 7O shows a sequence of images 151 through 154. In image 151 a gap between the bricks is observed. Then in image 152 the adhesive contacts the surface 6. Then in image 153 the two bricks are in contact, but no adhesive is visible as insufficient force has been applied to force extrusion of the adhesive. Finally in image 154, continued application of drive force to the brick forces extrusion of the adhesive which generates a fluorescent line or band along the contact surface. A change detection algorithm can detect the transition from image 153 to image 154.

The control system may be a standalone control system or a subsystem of a larger control system for the entire robotic apparatus. In some embodiments the control system is mounted on the lay arm, or is distributed between components on the gripper apparatus and layhead, and central control system components such as a computing apparatus located on the truck.

In one embodiment the processing is performed by one or more computing apparatus 110 comprising one or more central processing units (CPU) 112, a memory 114, and an Input/Output interface. The computing apparatus may be a microprocessor or microcontroller or it may be a standalone computer further include a graphical processing unit (GPU), a communications module (if not integrated into the CPU or Input/Output interface), and input and output devices such as keyboard, mouse, touch screen, displays, etc. The CPU may comprise an Input/Output Interface, an Arithmetic and Logic Unit (ALU) and a Control Unit and Program Counter element. The Input/Output Interface may comprise lines or inputs for receiving signals or data from the sensors. A communications module may form part of the CPU or be connected to the CPU via the Input/Output interface, and be configured to communicate with a communications module in another device using a predefined communications protocol which may be wireless or wired (e.g. Bluetooth, WiFi, Zigbee, IEEE 802.15, IEEE 802.11, TCP/IP, UDP, etc). The computing apparatus may be a server, desktop or portable computer and may comprise a single CPU (core), multiple CPU's (multiple core), multiple processors, parallel processors, vector processors, or be may be part of a distributed (cloud) computing apparatus. The memory is operatively coupled to the processor(s) and may comprise RAM and ROM components, and secondary storage components such as solid state disks and hard disks, which may be provided within or external to the device. The memory may comprise instructions to cause the processor to execute a method described herein. The memory may be used to store the operating system and additional software modules or instructions. The processor(s) may be configured to load and execute the software code, modules or instructions stored in the memory.

The software modules that contain computer code for implementing the control system described herein may be we written in a high level language such as C # or Java. Image processing functions and related image processing libraries 114 such as MATLAB libraries, OpenCV C++ Libraries, ccv C++ CV Libraries, or ImageJ Java CV libraries which implement functions such as object recognition, feature detection, shape and edge detection, segmentation, shape matching, fitting, transformations, rotations, etc, may be used. Similarly statistical and signal processing libraries may be utilised, for example to perform fitting and matching operations. Various database systems and similar data structures may be used to store data regarding the build (eg bricks, images of the placement), etc.

The processing of signals may be performed directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, or any suitable form of computer readable medium.

A gripping apparatus, and associated control system and method have been described herein. Whilst suited to a construction robot it will be understood that the apparatus, control system and method could be used in other applications where it is necessary to accurately place an object with sufficient but not applying excessive force. Various sensors may be used to either measure a relative movement between the gripper assembly and the connector body in a direction aligned with the placement axis or to measure a force between the gripper assembly and connector body in direction aligned with the placement axis.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers. As used herein, a phrase referring to "at least one of" a list of items refers to any combination of those items, including single members. As an example, "at least one of: a, b, or c" is intended to cover: a, b, c, a-b, a-c, b-c, and a-b-c.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A gripping apparatus for controllably placing an object, the gripping apparatus including:
   a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;
   a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and,
   a controller configured to send a stop signal to the robot arm to stop further drive of the gripper assembly along the placement axis when the sensor output signal indicates the measured relative movement or measured force exceeds a predefined threshold,
   wherein either the housing includes a cavity that extends in a direction aligned with the placement axis and encompasses a flange portion of the connector body or the connector body includes a cavity that extends in a direction aligned with the placement axis and encompasses a flange portion of the housing; and, the sensor is configured to measure the relative movement of the flange portion within the cavity in the direction aligned with the placement axis.

2. The gripping apparatus as claimed in claim 1, wherein the controller is further configured to send a gripper drive control signal to the one or more gripper drive assemblies to cause the pair of opposing gripping clamps to release a gripped object in response to the sensor output signal indicating that the measured relative movement or measured force exceeds the predefined threshold.

3. The gripping apparatus as claimed in claim 2, wherein the sensor is a linear encoder.

4. The gripping apparatus as claimed in claim 1, wherein the sensor is a linear encoder.

5. The gripping apparatus as claimed in claim 4, where the linear encoder includes a readhead located on the connector body and a scale located on the housing or a readhead located on the housing and a scale located on the connector body.

6. The gripping apparatus as claimed in claim 1, further including at least one spring member extending from the housing to the connector body, and wherein the sensor is a force sensor configured to measure the extension of the spring.

7. The gripping apparatus as claimed in claim 1, further including at least one spring member extending from the housing to the connector body, and wherein the sensor is a distance sensor configured to measure the distance from the connector to the object being gripped.

8. The gripping apparatus as claimed in claim 1, wherein the sensor is a load cell located in series between the connector body and the gripper assembly to measure a force in a direction aligned with the placement axis.

9. The gripping apparatus as claimed in claim 1, wherein the sensor includes one or more limit switches, wherein at least one limit switch is located a predefined distance from an initial position of the flange portion.

10. The gripping apparatus as claimed in claim 9, wherein the sensor includes at least two limit switches, wherein at least one limit switch is located at an initial position of the flange.

11. The gripping apparatus as claimed in claim 1, wherein:
    the connector body includes a shaft co-axially aligned with the placement axis and a compliance plate extending in a plane orthogonal to the placement axis to define two flange portions at opposing ends of the compliance plate; and
    the housing includes an upper housing mounted to a lower housing, and the gripping clamps are mounted to the lower housing, and the upper housing and lower housing define the cavity.

12. The gripping apparatus as claimed in claim 11, wherein each of the two flange portions further comprise a cut-out portion with a stop surface extending in a plane orthogonal to the placement axis and a pair of projections in the cavity walls extend into each cut-out portion such that as the housing moves relative to the connector body, the projections move in a direction aligned with the placement axis until they engage with each stop surface to define a maximum compliance distance.

13. The gripping apparatus as claimed in claim 12, wherein the sensor is a magnetic linear encoder, and a readhead is attached to the housing and a scale is mounted on the compliance plate.

14. The gripping apparatus as claimed in claim 13, wherein the sensor is configured to detect when a gripped object contacts the placement surface by measuring when at least a portion of the maximum compliance distance is reached.

15. The gripping apparatus as claimed in claim 11, wherein the connector body includes a plurality of shafts extending from the compliance plate parallel to the placement axis, and the upper housing includes a plurality of roller bearings that receive each of the shafts to thereby guide relative movement of the housing with respect to the connector body in the direction of the placement axis.

16. A gripping apparatus for controllably placing an object, the gripping apparatus including:
    a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;
a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and,
a controller configured to send a stop signal to the robot arm to stop further drive of the gripper assembly along the placement axis when the sensor output signal indicates the measured relative movement or measured force exceeds a predefined threshold,
wherein the sensor is an imaging sensor with a field of view that includes a distal side of a gripped object and further includes an excitation source, and wherein in use the gripping clamps grip an object coated on the distal side with a substance that emits light when excited by the excitation source, and a processor is configured to perform change detection on a series of images to detect when the distal side makes contact with the placement surface, and when the substance is extruded from a surface point between the distal side of the gripped object and the placement surface.

17. A method for controlling placement of an object using a gripping apparatus of, including:
a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;
a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and
a controller configured to send a stop signal to the robot arm to stop further drive of the gripper assembly along the placement axis when the sensor output signal indicates the measured relative movement or measured force exceeds a predefined threshold, and
the method including:
placing a gripped object onto a placement surface;
monitoring the sensor whilst continuing to drive the gripper assembly along the placement axis;
sending a stop signal to the robot arm to stop further drive of the gripper assembly when the sensor indicates the measured relative movement or measured force exceeds a predefined threshold; and,
sending a gripper drive control signal to the one or more gripper drive assemblies to cause the opposing gripping clamps to release the object,
wherein either the housing includes a cavity that extends in a direction aligned with the placement axis and encompasses a flange portion of the connector body or the connector body includes a cavity that extends in a direction aligned with the placement axis and encompasses a flange portion of the housing; and, the sensor is configured to measure the relative movement of the flange portion within the cavity in the direction aligned with the placement axis.

18. A computer readable medium including instructions for causing a processor to perform a method for controlling placement of an object using a gripping apparatus, the gripping apparatus including:
a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;
a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and,
a controller configured to send a stop signal to the robot arm to stop further drive of the gripper assembly along the placement axis when the sensor output signal indicates the measured relative movement or measured force exceeds a predefined threshold, and
the instructions causing the processor to:
instruct the gripper assembly to place a gripped object onto a placement surface;
monitor the sensor whilst continuing to drive the gripper assembly along the placement axis;
send a stop signal to the robot arm to stop further drive of the gripper assembly when the sensor indicates the measured relative movement or measured force exceeds a predefined threshold; and,
send a gripper drive control signal to the one or more gripper drive assemblies to cause the opposing gripping clamps to release the object,
wherein either the housing includes a cavity that extends in a direction aligned with the placement axis and encompasses a flange portion of the connector body or the connector body includes a cavity that extends in a direction aligned with the placement axis and encompasses a flange portion of the housing; and, the sensor is configured to measure the relative movement of the flange portion within the cavity in the direction aligned with the placement axis.

19. A method for controlling placement of an object using a gripping apparatus of, including:
a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;
a sensor configured to either measure a relative movement between the grippers assembly and the connector body in a direction aligned with the placement axis or to measure a force between the gripper assembly and the connector body in a direction aligned with the placement axis, wherein the sensor generates a sensor output signal based on the measurement; and a controller configured to send a stop signal to the robot arm to stop further drive of the gripper assembly along the placement axis when the sensor output signal indicates the measured relative movement or measured force exceeds a predefined threshold, and the method including:

placing a gripped object onto a placement surface;

monitoring the sensor whilst continuing to drive the gripper assembly along the placement axis;

sending a stop signal to the robot arm to stop further drive of the gripper assembly when the sensor indicates the measured relative movement or measured force exceeds a predefined threshold; and, sending a gripper drive control signal to the one or more gripper drive assemblies to cause the opposing gripping clamps to release the object, wherein the sensor is an imaging sensor with a field of view that includes a distal side of a gripped object and further includes an excitation source, and wherein in use the gripping clamps grip an object coated on the distal side with a substance that emits light when excited by the excitation source, and a processor is configured to perform change detection on a series of images to detect when the distal side makes contact with the placement surface, and when the substance is extruded from a surface point between the distal side of the gripped object and the placement surface.

20. A computer readable medium including instructions for causing a processor to perform a method for controlling placement of an object using a gripping apparatus, the gripping apparatus including:

a gripper assembly mounted to a robot arm via a connector body, the gripper assembly including a housing that supports one or more gripper drive assemblies operatively coupled to a pair of opposing gripping clamps configured to grip and release an object in response to one or more gripper drive control signals, and in use the robot arm is configured to drive the gripper assembly along a placement axis towards a placement surface via the connector body;

a sensor configured to either measure a relative movement between the gripper assembly and the connector body in a direction aligned with the placement axis or to measure a force between the gripper assembly and the connector body in a direction aligned with the placement axis, wherein the sensor generates a sensor output signal based on the measurement; and, a controller configured to send a stop signal to the robot arm to stop further drive of the gripper assembly along the placement axis when the sensor output signal indicates the measured relative movement or measured force exceeds a predefined threshold, and the instructions causing the processor to:

instruct the gripper assembly to place a gripped object onto a placement surface;

monitor the sensor whilst continuing to drive the gripper assembly along the placement axis;

send a stop signal to the robot arm to stop further drive of the gripper assembly when the sensor indicates the measured relative movement or measured force exceeds a predefined threshold; and, send a gripper drive control signal to the one or more gripper drive assemblies to cause the opposing gripping clamps to release the object, wherein the sensor is an imaging sensor with a field of view that includes a distal side of a gripped object and further includes an excitation source, and wherein in use the gripping clamps grip an object coated on the distal side with a substance that emits light when excited by the excitation source, and the instructions further comprise instructions for configuring the processor to perform change detection on a series of images to detect when the distal side makes contact with the placement surface, and when the substance is extruded from a surface point between the distal side of the gripped object and the placement surface.

* * * * *